(12) United States Patent
Lee et al.

(10) Patent No.: US 12,230,227 B2
(45) Date of Patent: Feb. 18, 2025

(54) HOME APPLIANCE WITH DISPLAY PANEL

(71) Applicant: SAMSUNG ELECTRONICS CO., LTD., Suwon-si (KR)

(72) Inventors: Minkyung Lee, Suwon-si (KR); Youngdeog Koh, Suwon-si (KR); Kwangjoo Kim, Suwon-si (KR); Choongkeon Kim, Suwon-si (KR); Kyunghwan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/370,128

(22) Filed: Sep. 19, 2023

(65) Prior Publication Data
US 2024/0169941 A1 May 23, 2024

Related U.S. Application Data

(63) Continuation of application No. PCT/KR2023/012521, filed on Aug. 24, 2023.

(30) Foreign Application Priority Data

Nov. 22, 2022 (KR) .................. 10-2022-0157693
Dec. 30, 2022 (KR) .................. 10-2022-0190702

(51) Int. Cl.
G09G 3/34 (2006.01)
G02F 1/167 (2019.01)
G02F 1/1676 (2019.01)

(52) U.S. Cl.
CPC ............ G09G 3/344 (2013.01); G02F 1/167 (2013.01); G02F 1/1676 (2019.01);
(Continued)

(58) Field of Classification Search
CPC .......... G09G 3/344; G09G 2300/0426; G09G 2320/0666; G09G 2330/021;
(Continued)

(56) References Cited

U.S. PATENT DOCUMENTS 6,980,351 B2 12/2005 Ahn et al.
7,538,757 B2 5/2009 Zhou et al.
(Continued)

FOREIGN PATENT DOCUMENTS

JP 2017-167344 9/2017
KR 10-0438901 B1 7/2004
(Continued)

OTHER PUBLICATIONS

International Search Report dated Dec. 15, 2023 for International Application No. PCT/KR2023/012521.
(Continued)

Primary Examiner — Keith L Crawley
(74) Attorney, Agent, or Firm — STAAS & HALSEY LLP

(57) ABSTRACT

A home appliance including a main body; and a door to open and close the main body; and an electrophoretic display (EPD) panel on the door and including a plate to cover a portion of the door and to allow light to pass through, a first electrode configured to allow light pass through and a second electrode between the plate and the door, and an electrophoretic layer between the first electrode and the second electrode, and including a color cell in which first charged particles having a first color, and second charged particles having a second color are accommodated, the first charged particles and the second charged particles being flowable within the color cell, the second charged particles have a different charge than the first charged particles.

16 Claims, 14 Drawing Sheets

(52) U.S. Cl.
    CPC ............... *G09G 2300/0426* (2013.01); *G09G 2320/0666* (2013.01); *G09G 2330/021* (2013.01); *G09G 2330/028* (2013.01)

(58) Field of Classification Search
    CPC ... G09G 2330/028; G09G 2380/04–06; G09G 2380/14–16; G02F 1/167; G02F 1/1675–1679; G06F 1/1601; F25D 23/02; F25D 23/028; F25D 29/005; F25D 2400/18; F25D 2400/36–361; G09F 7/18; G09F 2007/1856
    See application file for complete search history.

(56) References Cited

U.S. PATENT DOCUMENTS

| | | | |
|---|---|---|---|
| 7,936,499 B2 | 5/2011 | Kim et al. | |
| 8,072,674 B2 | 12/2011 | Wang et al. | |
| 8,902,153 B2 | 12/2014 | Bouchard et al. | |
| 9,689,603 B2* | 6/2017 | Roh | F25D 23/028 |
| 10,268,086 B2* | 4/2019 | Kim | G06F 1/1637 |
| 10,317,766 B2 | 6/2019 | Verschueren | |
| 2009/0066636 A1 | 3/2009 | Kim et al. | |
| 2011/0279423 A1* | 11/2011 | Ohno | G02F 1/13452 |
| | | | 345/204 |
| 2016/0266422 A1 | 9/2016 | Zhang et al. | |
| 2020/0378679 A1* | 12/2020 | Lee | F16M 13/02 |
| 2022/0199594 A1* | 6/2022 | Shin | G09F 9/302 |
| 2022/0334448 A1* | 10/2022 | Jacobsen | G02F 1/1679 |
| 2022/0382400 A1* | 12/2022 | Brehm | G06F 3/0412 |
| 2023/0258388 A1* | 8/2023 | Yu | F25D 29/00 |
| | | | 312/405 |
| 2024/0282277 A1 | 8/2024 | Lin | |

FOREIGN PATENT DOCUMENTS

| | | |
|---|---|---|
| KR | 10-2006-0017521 A | 2/2006 |
| KR | 10-2009-0025511 A | 3/2009 |
| KR | 10-2010-0062916 | 6/2010 |
| KR | 10-1030936 B1 | 4/2011 |
| KR | 10-2011-0074242 | 6/2011 |
| KR | 10-1085701 B1 | 11/2011 |
| KR | 10-1225533 B1 | 1/2013 |
| KR | 10-2013-0057733 A | 6/2013 |
| KR | 10-2013-0065333 A | 6/2013 |
| KR | 10-2014-0004888 A | 1/2014 |
| KR | 10-1445811 B1 | 10/2014 |
| KR | 10-2017-0027851 | 3/2017 |
| KR | 10-1964078 B1 | 4/2019 |
| KR | 10-2022-0073626 A | 6/2022 |

OTHER PUBLICATIONS

Written Opinion of the International Searching Authority dated Dec. 15, 2023 for International Application No. PCT/KR2023/012521.

* cited by examiner

HOME APPLIANCE WITH DISPLAY PANEL

CROSS-REFERENCE TO RELATED APPLICATIONS

This application is a continuation application, under 35 U.S.C. § 111(a), of International Application No. PCT/KR2023/012521, filed on Aug. 24, 2023, which claims priority under 35 U.S.C. § 119 to Korean Patent Application No. 10-2022-0157693, filed on Nov. 22, 2022 and Korean Patent Application No. 10-2022-0190702, filed on Dec. 30, 2022, in the Korean Intellectual Property Office, the disclosures of which are incorporated by reference herein in their entireties.

BACKGROUND

1. Field

The disclosure relates to a home appliance, and more particularly, to a home appliance including an electrophoretic display panel.

2. Description of the Related Art

In general, home appliances are appliances that are primarily used in a user's home to assist in the user's household chores. For example, home appliances include refrigerators, air conditioners, air purifiers, vacuum cleaners, cooking appliances, dishwashers, clothes care appliances, washing machines, and the like.

Doors and other panels that form the exterior of a home appliance are typically the most visible parts of the home appliance to users. Accordingly, users may change the exterior design of a home appliance by replacing an exterior panel of the home appliance according to their preferences. However, to change the exterior design of the home appliance by replacing the exterior panel, the exterior panel must be separately prepared and reinstalled, resulting in a loss of cost or time.

SUMMARY

Aspects of embodiments of the disclosure will be set forth in part in the description which follows and, in part, will be apparent from the description, or may be learned by practice of the presented embodiments.

According to an embodiment of the disclosure, a home appliance includes a main body; and a door configured to open and close the main body, the door including a door body, and an electrophoretic display (EPD) panel disposed on a front side of the door body. The EPD panel includes a plate configured to cover at least a portion of the front side of the door body and to allow light to pass through, a first electrode between the plate and the door body and configured to allow light to pass through, a second electrode between the first electrode and the door body so as to face the first electrode, and an electrophoretic layer between the first electrode and the second electrode, and including a color cell in which first charged particles having a first color and second charged particles having a second color different from the first color are accommodated, the first charged particles and the second charged particles being flowable within the color cell, the second charged particles having a different charge than the first charged particles.

According to an embodiment of the disclosure, the EPD panel may include a protective plate between the second electrode and the door body.

According to an embodiment of the disclosure, the door body may include a base facing the protective plate, and a coupling portion protruding from the base. The protective plate may be coupled to the coupling portion.

According to an embodiment of the disclosure, the protective plate may include a metal material having high rigidity.

According to an embodiment of the disclosure, the EPD panel may include a sealing member disposed along an edge of the EPD panel and configured to cover at least a portion of the edge of the EPD panel.

According to an embodiment of the disclosure, the sealing member may be configured to cover outer edges of each of the first electrode, the second electrode, and the electrophoretic layer.

According to an embodiment of the disclosure, the plate may include a stepped portion extending outwardly from an edge of each of the first electrode, the second electrode, and the electrophoretic layer. The sealing member may be disposed behind the stepped portion.

According to an embodiment of the disclosure, the sealing member may be configured to entirely cover a rear side of the stepped portion.

According to an embodiment of the disclosure, the EPD panel may include a protective plate between the second electrode and the door body. The stepped portion may extend further in an outward direction than an outer edge of the protective plate. The sealing member may be configured to cover the outer edge of the protective plate.

According to an embodiment of the disclosure, the home appliance may further include a power supply configured to apply a voltage between the first electrode and the second electrode; and a processor configured to control an operation of the power supply. The processor may be configured to control the power supply to apply a first voltage between the first electrode and the second electrode so that the first charged particles flow toward the first electrode based on receiving an electrical signal corresponding to a first color mode, and control the power supply to apply a second voltage between the first electrode and the second electrode so that the second charged particles flow toward the first electrode based on receiving an electrical signal corresponding to a second color mode different from the first color mode.

According to an embodiment of the disclosure, the processor may be configured to control the power supply to apply the voltage between the first electrode and the second electrode for a predetermined time based on the electrical signal corresponding to the first color mode or the second color mode being received, and control the power supply to stop applying the voltage after the predetermined time has elapsed.

According to an embodiment of the disclosure, the processor may be configured to, after a reference time has elapsed after controlling the power supply to stop applying the voltage, control the power supply to apply the voltage between the first electrode and the second electrode for the predetermined time.

According to an embodiment of the disclosure, the color cell may include a plurality of color cells. The electrophoretic layer may include a light transmitting portion applied to the first electrode and configured so that light is passable through the light transmitting portion. The plurality of color cells may be disposed within the light transmitting portion.

According to an embodiment of the disclosure, the light transmitting portion may include a plastic material cured by heat.

According to an embodiment of the disclosure, the second electrode may include a light-blocking material.

According to an embodiment of the disclosure, a home appliance includes a body; and an electrophoretic display (EPD) panel disposed on a surface of the body. The EPD panel includes a plate configured to cover at least a portion of the surface of the body, a first electrode between the plate and the body and configured, a second electrode between the first electrode and the body so as to face the first electrode, and an electrophoretic layer between the first electrode and the second electrode, and including a color cell including first charged particles inside the color cell and having a first color, and second charged particles inside the color cell and having a second color different from the first color, and the EPD panel is configured so that light is passable through the plate and the first electrode, the first charged particles and the second charged particles are flowable within the color cell, the second charged particles have a different charge than the first charged particles, and a color presented by the EPD panel is changeable based on a voltage between the first electrode and the second electrode.

BRIEF DESCRIPTION OF THE DRAWINGS

These and/or other embodiments of the disclosure will become apparent and more readily appreciated from the following description of embodiments, taken in conjunction with the accompanying drawings of which.

DETAILED DESCRIPTION

Figure 1:
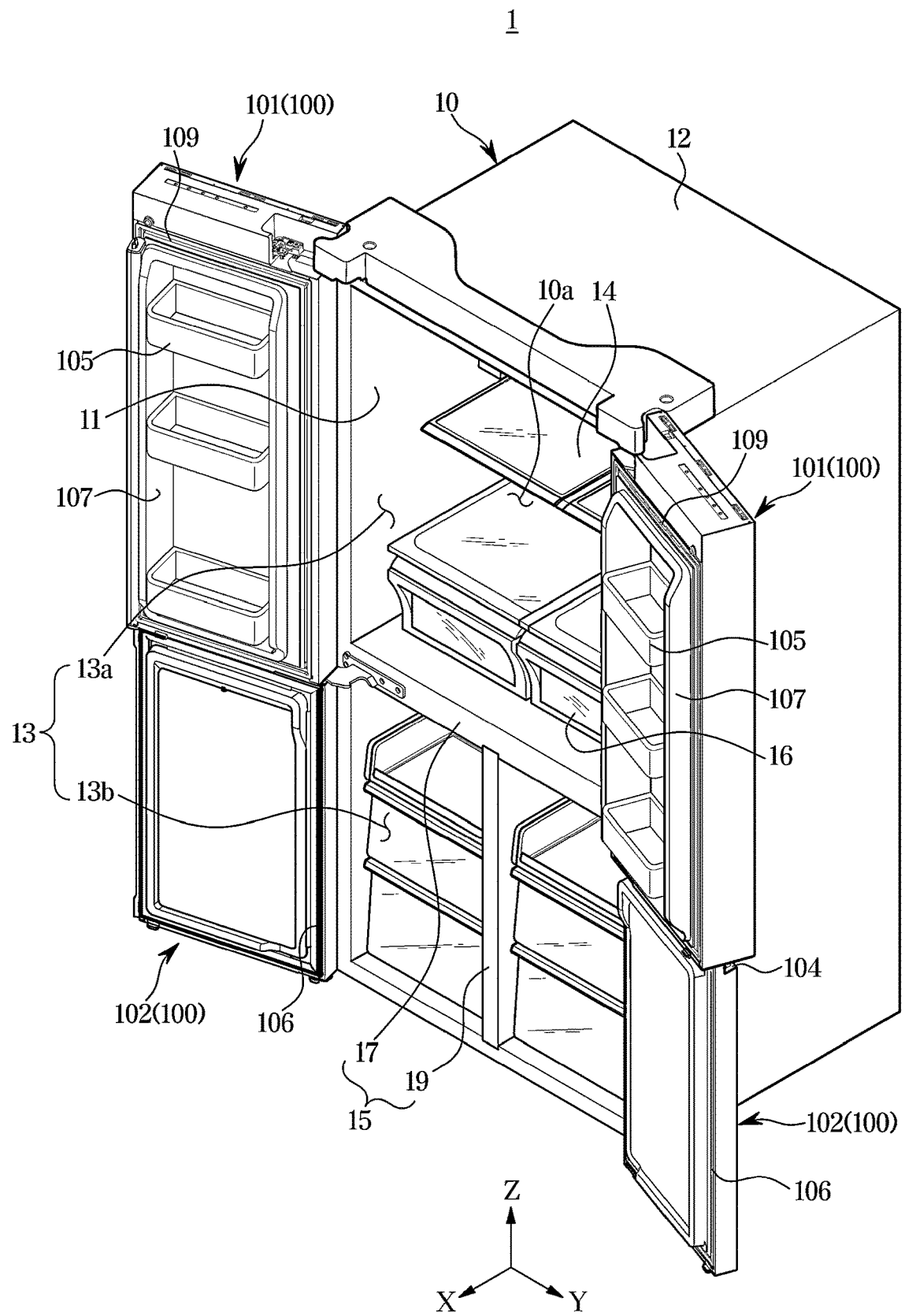
FIG. 1 is a perspective view illustrating a refrigerator as a type of home appliance according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate parts or components performing substantially the same function.

Furthermore, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, numbers, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front", "rear", "left side", and "right side" and the like may be defined by the drawings, but the shape and the location of the component is not limited by the term. For example, the term "front" as used herein may mean forward in an X direction relative to the drawing. The term "rear" may mean rearward in the X direction relative to the drawing. The terms "left" and "right" may mean left and right, respectively, in a Y direction relative to the drawing.

As used herein, the terms of "part", "portion", "module", "member", "component", or "block" may be implemented in software or hardware, and in some embodiments, a plurality of "parts", "portions", "modules", "members", "components", or "blocks" may be implemented as a single element, or a single "part", "portion", "module", "member", "component", or block" may comprise a plurality of elements.

When any (e.g., first) component is referred to as being "coupled" or "connected" to another (e.g., second) component with or without the terms "functionally" or "communicatively", this means that the any component may be connected to the other component directly (e.g., by a wire), wirelessly, or through a third component.

Embodiments of the disclosure may provide a home appliance having an improved structure such that an exterior design may be changed without replacing an exterior panel.

Embodiments of the disclosure may provide a home appliance having an improved structure such that power consumption required in a process of changing and maintaining the color of an exterior panel may be reduced.

Embodiments of the disclosure may provide a home appliance having an improved structure to prevent damage to an electrophoretic display panel and to improve the durability or lifespan of a product.

The home appliance according to the spirit of the disclosure may include the electrophoretic display panel, thereby changing the external design without replacing the exterior panel.

In the home appliance according to the spirit of the disclosure, the charged particles having different colors are in a bistable state in the color cell, so that the power consumption required in a process of changing and maintaining the color of the exterior panel may be reduced.

The home appliance according to the spirit of the disclosure may include a protective plate located at a position where the electrophoretic display panel is assembled, thereby preventing the electrophoretic display panel from being damaged, and improving the durability or life of a product.

The home appliance according to the spirit of the disclosure may include a sealing member provided along the edge of the electrophoretic display panel, thereby preventing the electrophoretic display panel from being damaged and improving the durability or life of a product.

Embodiments of the disclosure are not limited to the various aspects mentioned above, and other aspects not mentioned will be clearly understood by those skilled in the art from the description below.

Hereinafter, an embodiment according to the disclosure will be described in detail with reference to the accompanying drawings.

A home appliance according to the spirit of the disclosure may have an electrophoretic display (EPD) panel attached to an outer surface of a home appliance to change an exterior design or color based on a user input or operating condition.

A home appliance of the disclosure may include a refrigerator, an air conditioner, an air purifier, a vacuum cleaner, a cooking appliance, a dishwasher, a clothes care machine, a washing machine, and the like. However, a type of home appliance is not limited to the above examples, and may be included without limitation as long as it is a device that may be installed in a user's home.

Hereinafter, with reference to FIG. 1 to FIG. 14, each type of home appliance according to an embodiment of the disclosure, such as a refrigerator, a clothes care machine, a dishwasher, a cooking appliance, and a robot vacuum cleaner, will be described as examples, and the description of the above types of home appliances may be applied to other types of home appliances.

FIG. 1 is a perspective view illustrating a refrigerator as a type of home appliance according to an embodiment of the disclosure.

Referring to FIG. 1, a refrigerator 1 according to an embodiment of the disclosure includes a main body 10, a storage compartment 13 formed by being vertically partitioned inside the main body 10, and a door 100 opening and closing the storage compartment 13, and a cold air supply device (not shown) for supplying cold air to the storage compartment 13.

The main body 10 may include an inner case 11 forming the storage compartment 13, an outer case 12 coupled to the outside of the inner case to form an exterior, and a body heat insulator (not shown) foamed between the inner case and the outer case to insulate the storage compartment 13 from the outside.

The cold air supply device may generate cold air using a refrigeration cycle of compression, condensation, expansion, and evaporation of a refrigerant.

The storage compartment 13 may be divided into a plurality of areas by partitions 15, and a plurality of shelves 14 and storage containers 16 may be provided within the storage compartment 13 to store food and the like.

The storage compartment 13 may be divided into a plurality of storage compartments 13a and 13b by the partition 15, and the partitions 15 may include a first partition 17 disposed in a horizontal direction to divide the interior of the storage compartment 13 in a vertical direction and a second partition 19 disposed in the vertical direction to divide the interior of the storage compartment 13 in the horizontal direction.

The partitions 15 having a T-shape by combining the first partition 17 and the second partition 19 may divide the storage compartment 13 into three spaces. The upper storage compartment 13a of the upper storage compartment 13a and the lower storage compartment 13b, which are divided by the first partition 17, may be used as a refrigerating compartment, and the lower storage compartment 13b may be used as a freezing compartment.

The lower storage compartment 13b may be entirely used as a freezing compartment, but one of the lower storage compartments 13b may be used as a freezing compartment and the other of the lower storage compartments 13b may be used as a refrigerating compartment. Alternatively, one of the lower storage compartments 13b may be used as a freezing compartment, and the other of the lower storage compartments 13b may be used as both a freezing compartment and a refrigerating compartment.

The division of the storage compartment 13 as described above is merely an example, and the storage compartment 13 may be divided in other ways than the example described above.

The storage compartment 13 may be opened and closed by the door 100. The door 100 includes a pair of first doors (or upper doors 101) opening and closing the upper storage compartment 13a and a pair of second doors (or lower doors 102) opening and closing the lower storage compartment 13b.

The pair of first doors 101 and the pair of second doors 102 may open and close a body opening 10a of the opened main body 10. Handles may be provided on the first doors 101 and the second doors 102, and the user may use the handles provided on the first doors 101 and the second doors 102 to open the first doors 101 and the second doors 102.

A door shelf 105 for storing food may be provided on a rear surface of the first doors 101. The door shelf 105 may include a shelf support 107 extending vertically from the first doors 101 to support the door shelf 105 at both left and right sides of the door shelf 105. As shown in FIG. 1, the shelf support 107 may protrude rearward from the rear surface of the first doors 101 and extend vertically. The shelf support 107 may be detachably provided to the first doors 101 as a separate structure.

A first gasket 109 may be provided at a rear edge of the first doors 101 to seal a gap with the main body 10 in a state where the first doors 101 are closed. The first gasket 109 may be installed in a loop shape along an edge on the rear surface of the first doors 101, and a first magnet (not shown) may be included therein.

The lower storage compartment 13b may be opened and closed by the second door 102 rotatably coupled to the main body 10. A lower door handle 104 may be formed to be recessed on an upper surface of the second door 102. Although not shown, the second door 102 may be provided in a sliding manner.

A second gasket 106 may be provided at a rear edge of the second doors 102 to seal a gap with the main body 10 in a state where the second doors 102 are closed. The second gasket 106 may be installed in a loop shape along an edge on the rear surface of the second doors 102, and a second magnet (not shown) may be included therein.

The configurations of the refrigerator 1 described above with reference to FIG. 1 are merely an example for explaining a refrigerator, which is a type of home appliance according to the spirit of the disclosure, and the spirit of the disclosure is not limited thereto.

Figure 2:
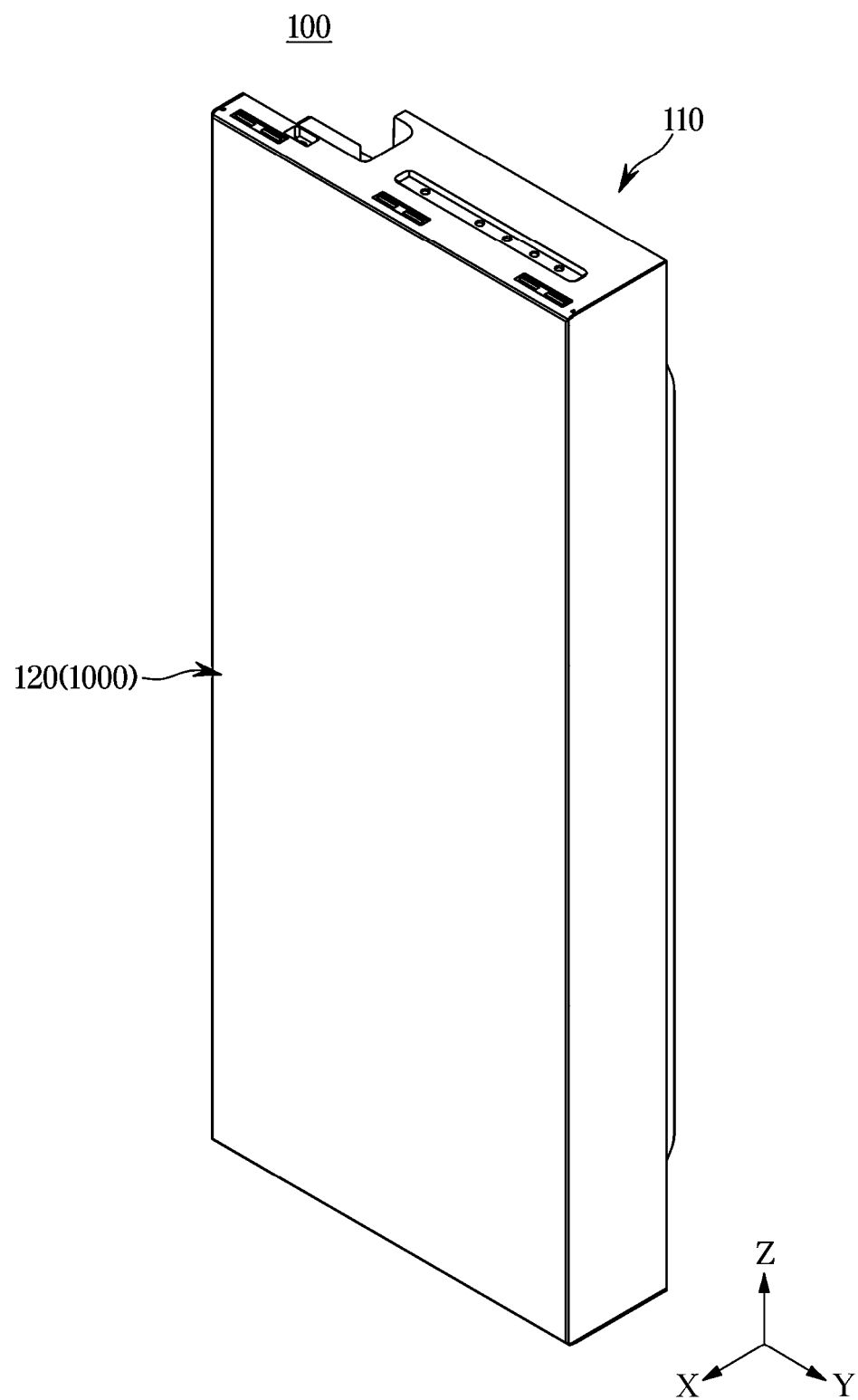
FIG. 2 is a perspective view illustrating a door of a home appliance according to an embodiment of the disclosure.
Figure 3:
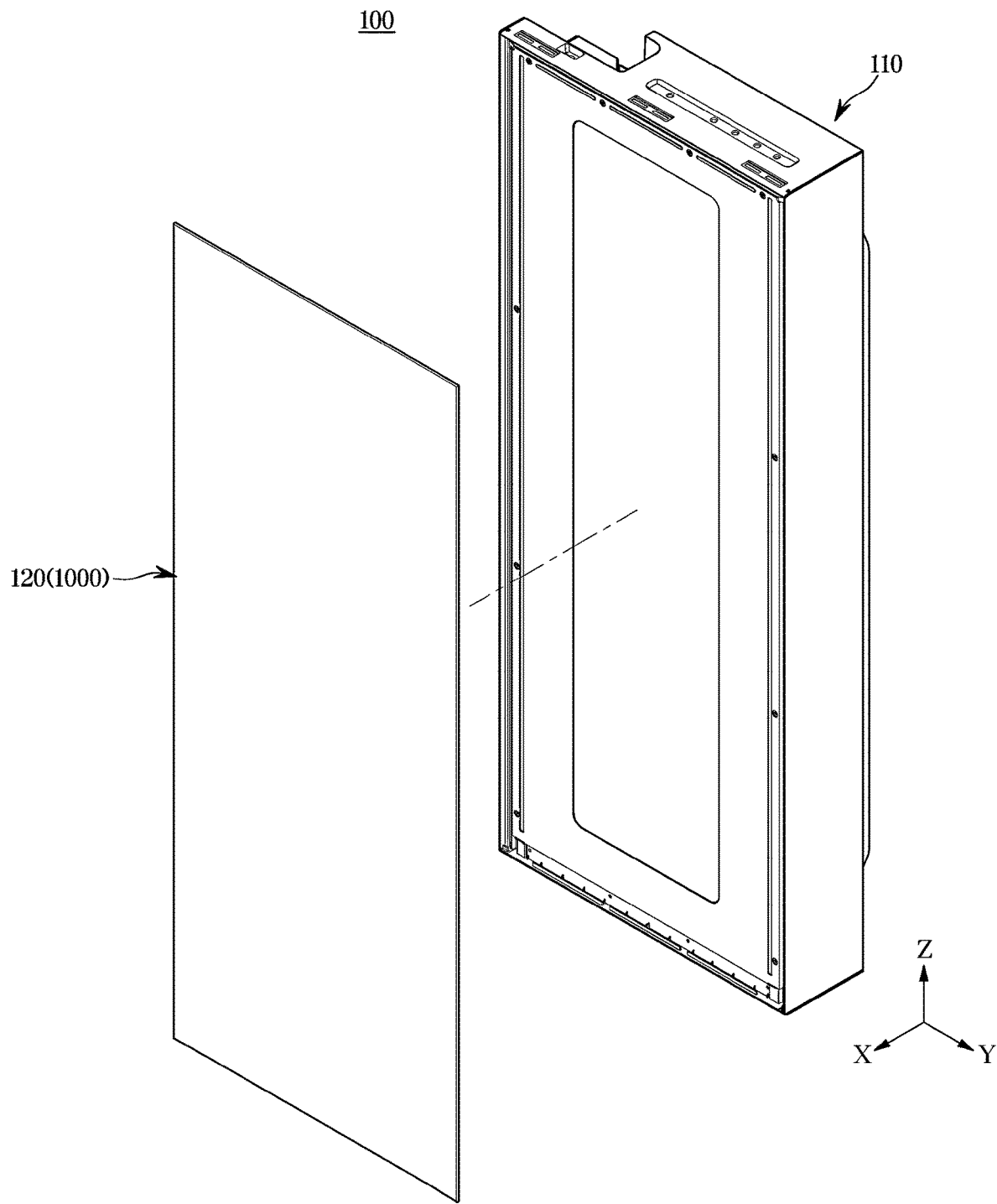
FIG. 3 is an exploded view in which some components of a door of a home appliance according to an embodiment of the disclosure are disassembled.

FIG. 2 is a perspective view illustrating a door of a home appliance according to an embodiment of the disclosure. FIG. 3 is an exploded view in which some components of a door of a home appliance according to an embodiment of the disclosure are disassembled.

In describing a door of a home appliance according to an embodiment of the disclosure with reference to FIG. 2 and FIG. 3, one door 100 (e.g., a left door of the upper doors 101 shown in FIG. 1) will be described for ease of description, and detailed descriptions of the remaining doors 100 (e.g., a right door of the upper doors 101 and the lower doors 102 shown in FIG. 1) having corresponding features will be omitted.

Referring to FIG. 2 and FIG. 3, the door 100 of a home appliance 1 may include a door body 110 and a door panel 120. The door panel 120 may be coupled to the door body 110.

The door panel 120 may be disposed in front of the door body 110. The door panel 120 may be coupled to a front surface of the door body 110. The door panel 120 may form a front exterior of the door 100.

Here, the direction of each component of the door 100 is defined based on when the door 100 is in a position to close the storage compartment 13. For example, "a front of the door body 110" means a front of the home appliance (refrigerator) 100 in an X direction when the door 100 is in a position to close the storage compartment 13. Also, for example, "a front surface of the door 100" means one side of the door 100 that is visible to the user when the door 100 is in a position to close the storage compartment 13.

The door body 110 may be provided with various components, such as a sash, a door cap, a cover, and a case to form an exterior of the door 100 and to seal the storage compartment 13 within the main body 10 from the outside.

For example, the door panel 120 may be formed to have a substantially flat plate shape. Correspondingly, the front surface of the door body 110 to which the door panel 120 is coupled may have a substantially flat plate shape.

The door panel 120 may be coupled to the door body 110 by various known methods.

The door panel 120 may include an electrophoretic display (EPD) panel 1000. The door panel 120 including the electrophoretic display panel 1000 may display different designs or colors based on a user input. Alternatively, the door panel 120 including the electrophoretic display panel 1000 may display different designs or colors based on an operating condition of the refrigerator 1.

Therefore, the user may change the exterior of the refrigerator 1 to a desired design or color without physically replacing the door panel 120.

However, in contrast to the above description, the electrophoretic display panel of the home appliance according to the spirit of the disclosure is not necessarily adapted only to the door panel. For example, the electrophoretic display panel 1000 may be used as a panel included in the main body 10 of the home appliance 1, and in addition to the main body 10, the electrophoretic display panel 1000 may be applied to various parts forming the exterior of a home appliance and positioned to be visible to users.

In the following, for the sake of simplicity, an example in which the electrophoretic display panel 1000 is included in the door 100 of the home appliance 1 will be described.

Hereinafter, the configuration and operation of the electrophoretic display panel 1000 will be described in detail.

Figure 4:
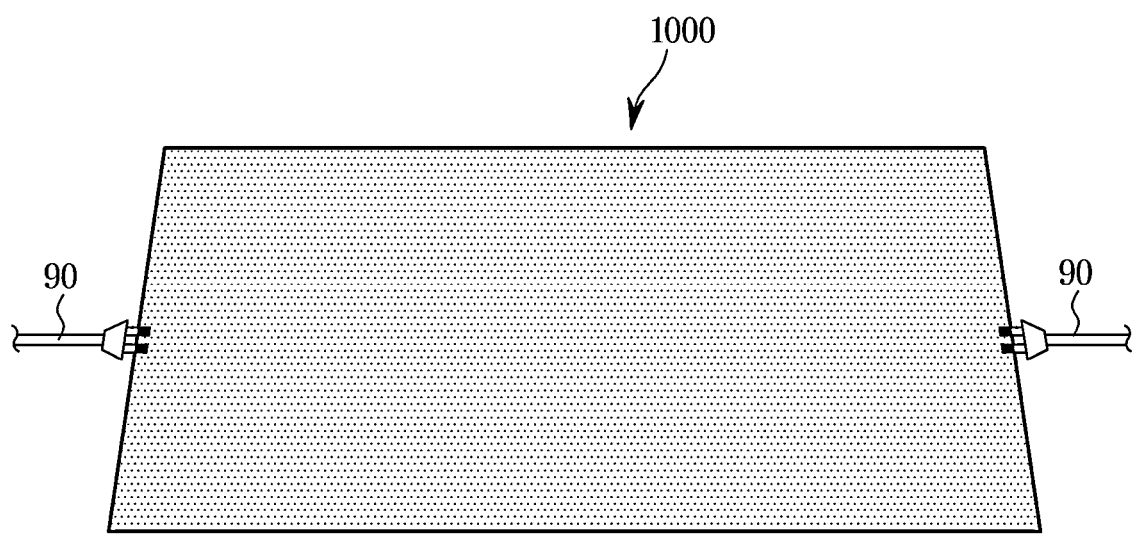
FIG. 4 is a view illustrating an electrophoretic display panel of a home appliance according to an embodiment of the disclosure.
Figure 5:
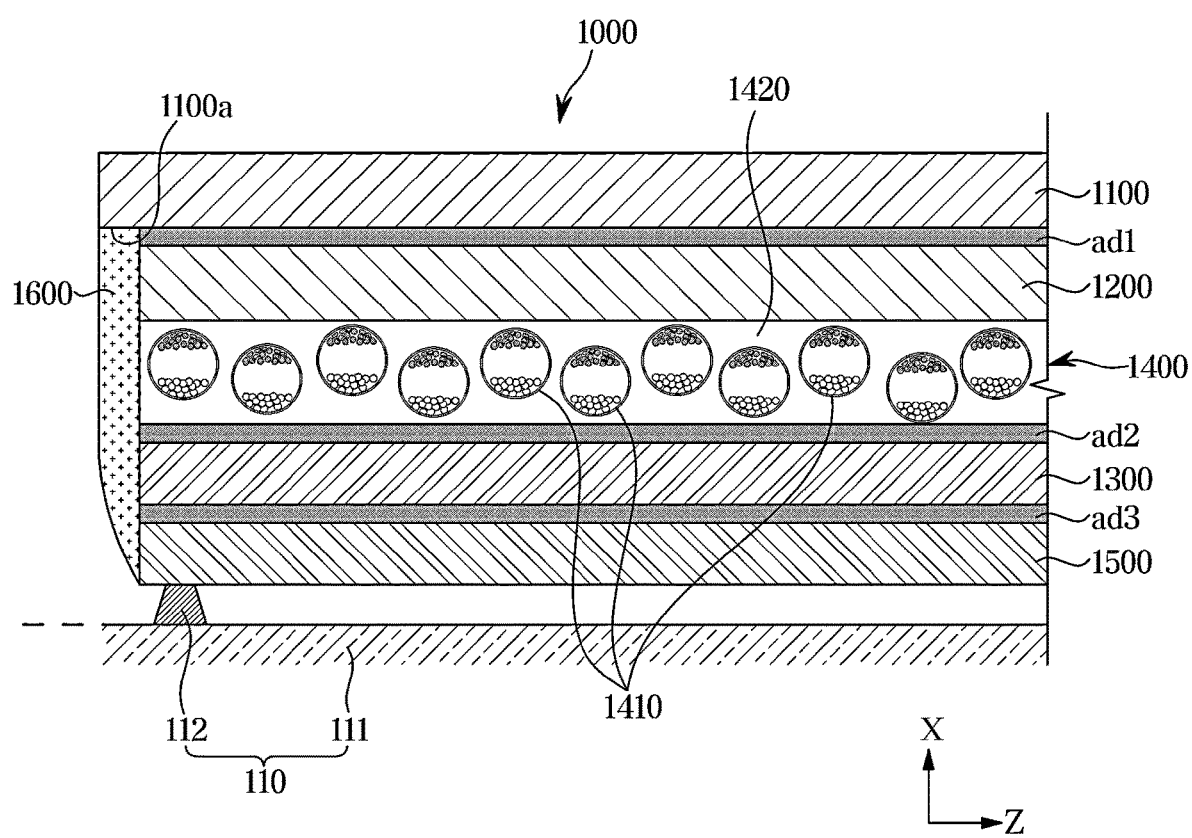
FIG. 5 is an enlarged cross-sectional view illustrating an electrophoretic display panel of a home appliance according to an embodiment of the disclosure.
Figure 6:
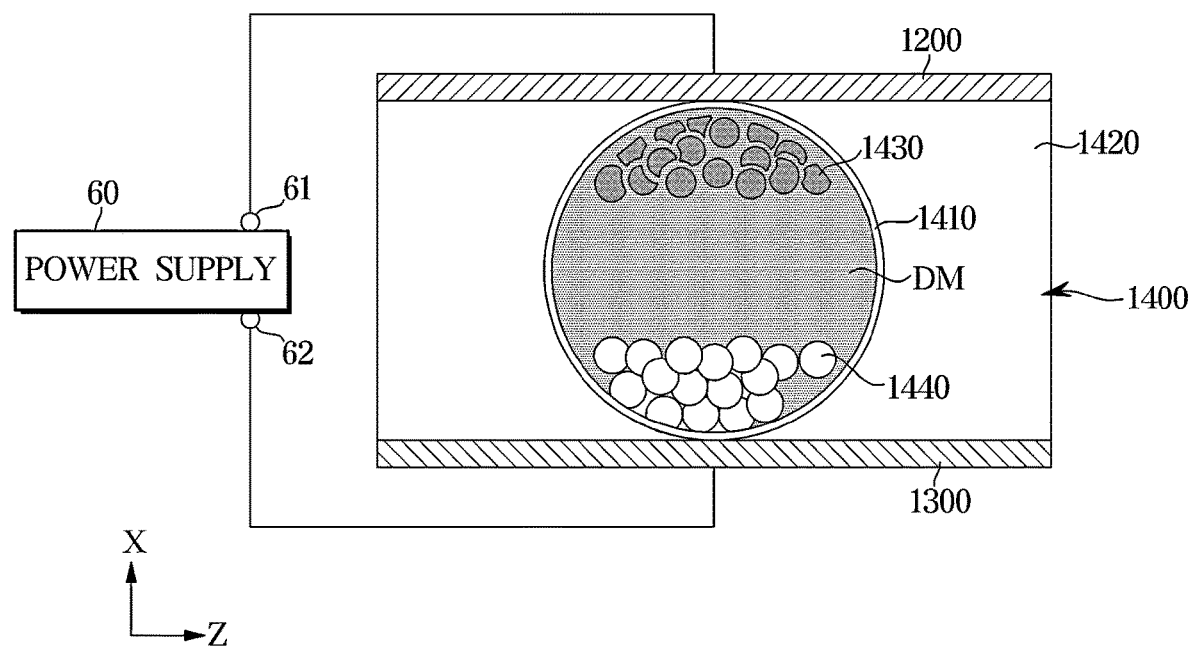
FIG. 6 is a view illustrating an appearance of an electrophoretic display panel of a home appliance according to an embodiment of the disclosure in a first color mode.
Figure 7:
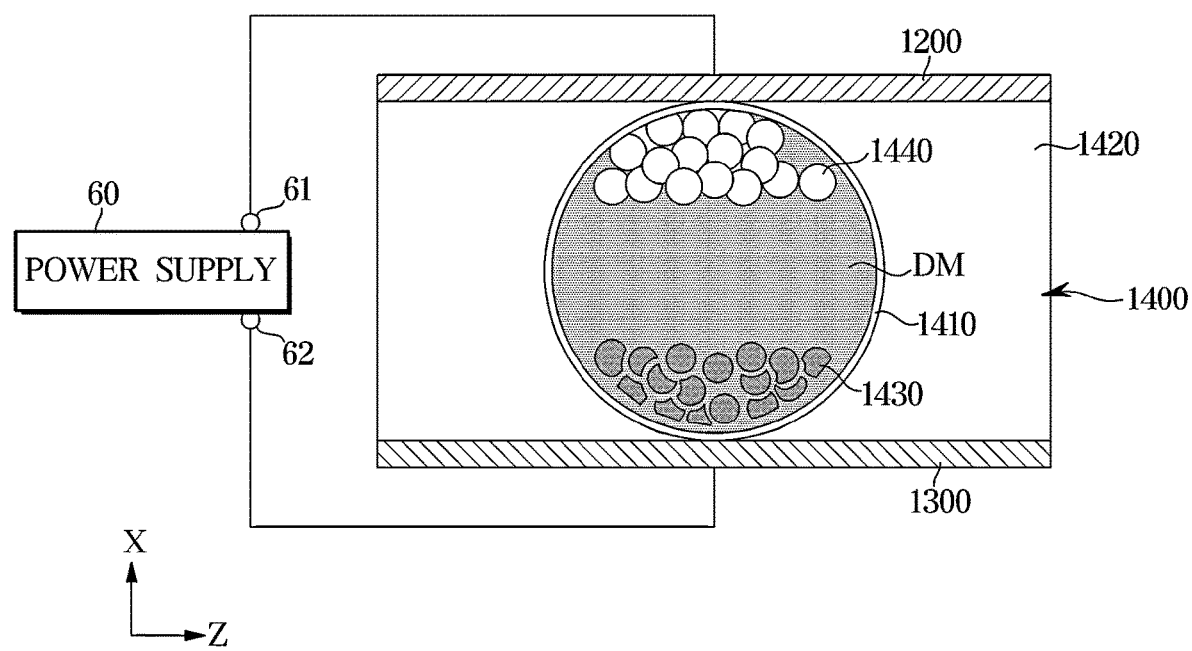
FIG. 7 is a view illustrating an appearance of an electrophoretic display panel of a home appliance according to an embodiment of the disclosure in a second color mode.

FIG. 4 is a view illustrating an electrophoretic display panel of a home appliance according to an embodiment of the disclosure. FIG. 5 is an enlarged cross-sectional view illustrating an electrophoretic display panel of a home appliance according to an embodiment of the disclosure. FIG. 6 is a view illustrating an appearance of an electrophoretic display panel of a home appliance according to an embodiment of the disclosure in a first color mode. FIG. 7 is a view illustrating an appearance of an electrophoretic display panel of a home appliance according to an embodiment of the disclosure in a second color mode.

Referring to FIG. 4 to FIG. 7, the home appliance 1 according to an embodiment of the disclosure may include the electrophoretic display panel 1000.

For example, the electrophoretic display panel 1000 may be included in the door 100. The electrophoretic display panel 1000 may form a front exterior of the door 100. The electrophoretic display panel 1000 may be coupled to the door body 110. For example, the electrophoretic display panel 1000 may be detachably coupled to the door body 110, but is not limited thereto.

The door body 110 may include a base 111 and a coupling portion 112 to which the electrophoretic display panel 1000 is coupled. For example, the coupling portion 112 may be formed to protrude from the base 111. In particular, the coupling portion 112 may protrude from the base 111 toward the electrophoretic display panel 1000, that is, toward the front of the door 100 in the X direction.

The base 111 may face a protective plate 1500 of the electrophoretic display panel 1000 to be described later. In other words, the base 111 may form at least a part of the front surface of the door body 110. The electrophoretic display panel 1000 may be mounted on the door body 110 after the protective plate 1500, described later, is coupled to the coupling portion 112.

In FIG. 5, the electrophoretic display panel 1000 is shown as being separated from the base 111 by a considerable distance, but this is for convenience of illustration and the spirit of the disclosure is not limited to that shown in FIG. 5.

The electrophoretic display panel 1000 may include a plate 1100 designed to transmit light. The plate 1100 may form the exterior of the door 100. The plate 1100 may form the outer surface of the door 100 and the outer surface of the electrophoretic display panel 1000.

The plate 1100 may cover one side of the door body 110. More specifically, one side of the door body 110 refers to a front side of the door 100 in the X direction at a position where the door 100 closes the main body 10. In other words, the plate 1100 may form a front appearance of the door 100. The plate 1100 may be positioned outside the base 111.

However, although the plate 1100 forms the exterior of the door 100 as described above, the spirit of the disclosure does not preclude a case where a different configuration is provided in the front of the plate. For example, in one embodiment, a component (e.g., a protective film, etc.) for protecting the plate 1100 may be provided on the front of the plate 1100 of the electrophoretic display panel 1000, in this case it can be seen that the plate 1100 is included when forming the exterior of the door 100.

The plate 1100 may be designed to transmit light. In other words, the plate 1100 may include a transparent material. Accordingly, light incident from an external light source of the home appliance 1 may pass through the plate 1100. At least some of the light transmitted through the plate 1100 may be reflected by color cells 1410 of an electrophoretic layer 1400, which will be described later, and the light reflected by the color cells 1410 may pass through the plate 1100 again. That is, the colors appearing as the color cells 1410 of the electrophoretic layer 1400 described later operate may be visible to the user through the plate 1100.

In the spirit of the disclosure, the expression that the plate 1100 is designed to transmit light is not limited to a case where light incident on the plate 1100 from the inside or outside of the plate 1100 completely transmits the plate 1100. This may also include a case where at least a portion of the light incident on one face of the plate 1100 is reflected, absorbed, refracted, or scattered by the plate 1100, but at least another portion is transmitted through the plate 1100 and emitted on the other face of the plate 1100.

Furthermore, the above expression does not mean that the whole of the plate 1100 is capable of transmitting light, and a case in which only a portion of the plate 1100 is capable of transmitting light may also be included. Moreover, the color of the plate 1100 does not limit the spirit of the disclosure.

For example, the plate 1100 may be configured to include a transparent glass material. Alternatively, for example, the plate 1100 may include a transparent plastic material. In this case, the plate 1100 may be manufactured by injection molding using a transparent resin or by cutting and machining a plate made of the transparent resin, but is not limited thereto. The plate 1100 may include various materials designed to transmit light.

The plate 1100 may be formed to have an approximately flat plate shape. More specifically, the plate 1100 may be formed to have a plate shape with flat front and rear surfaces, but is not limited thereto. For example, at least one surface of the plate 1100 may have a curved shape. In particular, at least a portion of a front surface of the plate 1100 may have a curved shape.

The plate 1100 may be formed to have a shape substantially corresponding to one surface of the door 100 (particularly, the front surface of the door 100 in the X direction).

The electrophoretic display panel 1000 may include a pair of electrodes 1200 and 1300. In detail, the pair of electrodes 1200 and 1300 may include a first electrode 1200 and a second electrode 1300 disposed to face the first electrode 1200. The first electrode 1200 and the second electrode 1300 may extend in parallel directions. The first electrode 1200 and the second electrode 1300 may be made of a conductive material.

The first electrode 1200 may be arranged between the plate 1100 and the door body 110. The first electrode 1200 may be arranged between the plate 1100 and the base 111. The first electrode 1200 may be disposed behind the plate 1100 and may be disposed in front of the door body 110.

For example, the first electrode 1200 may be attached to a rear surface of the plate 1100. In detail, the first electrode 1200 may be attached to the rear surface of the plate 1100 by a first adhesive layer ad1. The first adhesive layer ad1 may include an optical adhesive material configured to transmit light, including acrylic, silicone, or urethane-based materials.

The first electrode 1200 may be designed to transmit light. The first electrode 1200 may be formed of a transparent electrode. For example, the first electrode 1200 may include a material, such as indium tin oxide (ITO) or indium zinc oxide (IZO), but is not limited thereto. For example, the first electrode 1200 may include various materials for transmitting light.

The first electrode 1200 may be formed to have a substantially flat plate shape.

In the above, an embodiment in which the first electrode 1200 is integrally formed with a flat plate has been described with reference to FIG. 5, but the spirit of the disclosure is not limited thereto. For example, the first electrode of the electrophoretic display panel may be provided in such a way that a transparent electrode is formed on a surface of a transparent substrate capable of transmitting light. Here, the transparent substrate may include a glass material, polymethyl methacrylate (PMMA), polycarbonate (PC), polydimethylsiloxane, and the like. The first electrode may be formed on the transparent substrate by various methods, such as chemical vapor deposition (CVD), plasma enhanced CVD (PECVD), low pressure CVD (LPCVD), physical vapor deposition (PVD), sputtering, atomic layer deposition (ALD), and the like.

However, for ease of description, the following description will assume that the first electrode 1200 forms a single layer.

The second electrode 1300 may be arranged between the first electrode 1200 and the door body 110. The second electrode 1300 may be arranged between the first electrode 1200 and the base 111.

The second electrode 1300 may be disposed behind the first electrode 1200 and may be disposed in front of the door body 110.

The second electrode 1300 may be formed to have a substantially flat plate shape. The second electrode 1300 may be formed to have a size substantially corresponding to that of the first electrode 1200.

The second electrode 1300 may include a light-blocking material. Because the second electrode 1300 is designed to block light, a portion of the light incident on the electrophoretic layer 1400 after transmitting through the plate 1100 may be absorbed or reflected by the second electrode 1300 even though it is transmitted through the electrophoretic layer 1400.

The second electrode 1300 may include an aluminum deposition film material, but is not limited thereto. For example, the second electrode 1300 may include various conductive materials.

For example, the second electrode 1300 may be attached to a rear surface of the electrophoretic layer 1400 to be described later. In detail, the second electrode 1300 may be attached to the rear surface of the electrophoretic layer 1400 by a second adhesive layer ad2. For example, the second adhesive layer ad2 may include a conductive adhesive, such as a hot melt adhesive.

As shown in FIG. 4, the electrophoretic display panel 1000 may be electrically connected to a processor 51 (see FIG. 8) of the home appliance 1 via a connector 90.

Each of the first electrode 1200 and the second electrode 1300 may be electrically connected to the connector 90 by an adhesive member (not shown), receive a control instruction from the processor 51 of the refrigerator 1 connected to the connector 90 through the adhesive member and the connector 90, and apply an electric field to the color cells 1410 of the electrophoretic layer 1400, which will be described later, based on the control instruction. To this end, the first electrode 1200 and the second electrode 1300 may include a thin film transistor (TFT).

The home appliance 1 may include a power supply 60. The power supply 60 may be provided to apply a voltage between the first electrode 1200 and the second electrode 1300.

As shown in FIG. 6 and FIG. 7, the first electrode 1200 and the second electrode 1300 may be electrically connected to the power supply 60, respectively. The power supply 60 may be electrically connected to the first electrode 1200 and the second electrode 1300, respectively, by the connector 90.

For example, the first electrode 1200 may be electrically connected to a first terminal 61 of the power supply 60, and the second electrode 1300 may be electrically connected to a second terminal 62 of the power supply 60. The first terminal 61 and the second terminal 62 may be configured to provide potentials opposite to each other.

During operation of the power supply 60, a potential difference may or may not be created between the first electrode 1200 and the second electrode 1300.

As will be described later, the power supply 60 may be electrically connected to the processor 51 of the home appliance 1, and operations may be controlled by the processor 51.

The electrophoretic display panel 1000 may include the electrophoretic layer 1400. The electrophoretic layer 1400 may be arranged between the first electrode 1200 and the second electrode 1300.

The electrophoretic layer 1400 may include the color cells 1410. The color cells 1410 may be provided to give a color to the light incident on the electrophoretic layer 1400 and provide the color to the user. The color cell 1410 may be provided to switch a color mode of the electrophoretic display panel 1000 provided to the user based on a potential difference between the first electrode 1200 and the second electrode 1300.

A plurality of color cells 1410 may be arranged in the electrophoretic layer 1400.

The color cells 1410 may flowably accommodate first charged particles 1430 having a first color, and second charged particles 1440 having a second color different from the first color. The second charged particles 1440 may have a charge different from that of the first charged particles 1430. A plurality of first charged particles 1430 and a plurality of second charged particles 1440 may be accommodated in one color cell 1410.

The first charged particles 1430 and the second charged particles 1440 may be composed of conductive pigment particles.

For example, each of the first charged particles 1430 and the second charged particles 1440 may have a size of about 1 micrometer.

Each of the first color and the second color may include different colors, such as colored, black, and white.

The color cells 1410 may impart a color to light incident on the color cells 1410, such as the light transmitted through the plate 1100 and the first electrode 1200. The color imparted to the light may correspond to the inherent color of the charged particles that are disposed on the outer side (i.e., charged particles disposed adjacent to the first electrode 1200, charged particles disposed adjacent to the front in the X direction) among the first charged particles 1430 and the second charged particles 1440.

When the light transmitted through the plate 1100 and the first electrode 1200 is white light, the light reflected from the color cells 1410 may have the same color as or at least a similar color to the inherent color of the charged particles disposed on the outer side among the first charged particles 1430 and the second charged particles 1440.

Each of the color cells 1410 may be formed in a capsule shape in which a space is formed therein. For example, the edge of the color cell 1410 may be made of a plastic material (e.g., urethane material).

For example, the color cell 1410 may be formed to have a substantially spherical shape, but the shape is not limited thereto.

The color cell 1410 may include a dispersion medium (DM) accommodated in the color cell 1410. The inner space of the color cell 1410 may be filled with the DM. The DM may be provided to transmit light. In other words, the DM may include a material having high light transmittance.

The charged particles 1430 and 1440 may be mixed with the DM and accommodated in the color cell 1410, and may be flowably provided within the color cell 1410 by the DM. For example, the charged particles 1430 and 1440 may be dispersed and accommodated in a colloidal suspension state within the color cell 1410.

When an electric field is not applied to the inside of the color cell 1410, the charged particles 1430 and 1440 may be dispersed and placed in the DM. When an electric field is applied to the inside of the color cell 1410, the charged particles 1430 and 1440 dispersed in the DM may flow along a direction of the electric force applied by the electric field.

The DM may be formed in an aqueous or gaseous state. To avoid settling of the charged particles CP due to gravity, the specific gravity of the DM and the specific gravity of the CP may be set to be substantially the same. For example, the DM may contain various types of materials, such as water, alcoholic solvents (e.g., methanol, ethanol, isopropanol, butanol, octanol, methylcellulose, etc.), various esters (e.g., ethyl acetate, butyl acetate, etc.), ketones (e.g., acetone, methylethylketone, methylisobutylgethone, etc.), aliphatic hydrogen oxides (e.g., pentane, hexane, octane, etc.), alicyclic hydrocarbons (e.g., cyclohexane, methylcyclohexane, etc.), aromatic hydrocarbons (e.g., benzene with long-chain alkyl groups, such as benzene, toluene, xylene, hexylbenzene, heptylbenzene, octylbenzene, nonylbenzene, decylbenzene, undecylbenzene, dodecylbenzene, tridecylbenzene, tetradecylbenzene, etc.), halogenated hydrocarbons (e.g., methylene chloride, chloroform, carbon tetrachloride, 1,2-dichloroethane, etc.), carbonates, or various other oils, alone or in mixtures with surfactants, etc. Here, the DM is not limited to the above examples, and may contain various types of materials having the properties of allowing light to transmit through and of allowing the charged particles 1430 and 1440 to flow in a mixed state in the DM.

The electrophoretic layer 1400 may include a light transmitting portion 1420 provided to transmit light. The light transmitting portion 1420 may be applied to the first electrode 1200.

The plurality of color cells 1410 may be disposed within the light transmitting portion 1420. For example, the plurality of color cells 1410 may be distributed to have a substantially uniform density within the light transmitting portion 1420.

The light transmitting portion 1420 may include a material having high light transmittance. For example, the light transmitting portion 1420 may include a transparent plastic material. For example, the light transmitting portion 1420 may include a plastic material cured by heat.

The light transmitting portion 1420 may have a refractive index substantially equal to or substantially similar to that of the DM, but is not limited thereto.

To manufacture the electrophoretic layer 1400, the plurality of color cells 1410 accommodating the charged particles 1430 and 1440 and the DM are first distributed substantially uniformly over the raw material of the light transmitting portion 1420 prior to curing and then a step of applying it to the first electrode 1200 may be performed. Here, the step of applying a mixture of the plurality of color cells 1410 and the raw material of the light transmitting portion 1420 prior to curing to the first electrode 1200 may be performed by, for example, a roll coating process.

Then, when a step of curing the raw material of the light transmitting portion 1420 applied to the first electrode 1200 by heat treatment is performed, the electrophoretic layer 1400 may be manufactured.

The method of manufacturing the electrophoretic layer 1400 described above is merely an example of a method of manufacturing an electrophoretic layer included in an electrophoretic display of a home appliance according to the spirit of the disclosure, and the spirit of the disclosure is not limited thereto.

An electric field may be applied between the first electrode 1200 and the second electrode 1300 according to a potential difference created between the first electrode 1200 and the second electrode 1300. When the electric field is applied between the first electrode 1200 and the second electrode 1300, the first charged particles 1430 and the second charged particles 1440 may be subjected to an electric force directed toward either one of the first electrode 1200 or the second electrode 1300.

The type of charge of the charged particles 1430 and 1440 and the potential difference formed between the first electrode 1200 and the second electrode 1300 vary depending on a direction in which the charged particles 1430 and 1440 are set to flow.

For example, as shown in FIG. 6, when the electrophoretic display panel 1000 operates in a first color mode, the potential difference that causes the first charged particles 1430 to flow toward the first electrode 1200 may be generated between the first electrode 1200 and the second electrode 1300. Simultaneously, the potential difference that causes the second charged particles 1440 to flow toward the second electrode 1300 may be generated between the first electrode 1200 and the second electrode 1300.

Accordingly, in the first color mode, the electrophoretic display panel 1000 may provide a first color appearance to the user.

For example, as shown in FIG. 7, when the electrophoretic display panel 1000 operates in a second color mode, the potential difference that causes the second charged particles 1440 to flow toward the first electrode 1200 may be generated between the first electrode 1200 and the second electrode 1300. At the same time, the potential difference that causes the first charged particles 1430 to flow toward the first electrode 1200 may be generated between the first electrode 1200 and the second electrode 1300.

Accordingly, in the second color mode, the electrophoretic display panel 1000 may provide a second color appearance to the user.

Meanwhile, in FIG. 5 to FIG. 7, it is assumed that each of the plurality of color cells 1410 provided on the electrophoretic display panel 1000 equally accommodates the charged particles 1430 and 1440 having two types of colors, but is not limited thereto. For example, each color cell 1410 may accommodate the charged particles 1430 and 1440 having different types of color combinations, and different exterior designs may be provided by color combinations of these color cells 1410.

With the above configurations, the home appliance 1 according to an embodiment of the disclosure includes the electrophoretic display panel 1000, and thus the exterior design of the home appliance 1 may be changed without replacing the exterior panel.

In addition, the electrophoretic display panel 1000 may provide high resolution color, such as paper and ink.

Furthermore, in the electrophoretic display panel 1000, the first charged particles 1430 and the second charged particles 1440 having different charges in the color cells 1410 are in a bistable state, so that the power consumption required in a process of maintaining after changing the color mode may be reduced.

Meanwhile, to maintain the bistability of the first charged particles 1430 and the second charged particles 1440 in the color cells 1410, design factors, such as the size and charge value of each charged particle may be appropriately set. For example, a total amount of charge of the first charged particles 1430 and a total amount of charge of the second charged particles 1440 in one color cell 1410 may be set to be substantially equal to or substantially similar to each other.

In addition, the electrophoretic display panel 1000 has flexibility, so it may be adapted to home appliances (not shown) configured in a curved shape and secure high visibility without limiting the viewing angle.

On the other hand, components of the electrophoretic display panel 1000 described above may be damaged by a load generated when the electrophoretic display panel 1000 is coupled to the door body 110.

For example, the coupling portion 112 to which the electrophoretic display panel 1000 is coupled may have a shape protruding from the base 111, and an area where the electrophoretic display panel 1000 comes into contact with the coupling portion 112 may be a very local area compared to the entire area of the electrophoretic display panel 1000. Accordingly, a load transmitted from the coupling portion 112 may be concentrated on a portion of the electrophoretic display panel 1000 that comes into contact with the coupling portion 112, so that a risk of damage to components in the corresponding area may be increased.

This is particularly problematic as the color cells 1410 of the electrophoretic layer 1400 may have poor durability due to material properties.

To solve this problem, the electrophoretic display panel 1000 may further include the protective plate 1500. The protective plate 1500 may be provided to increase the rigidity of the electrophoretic display panel 1000. The protective plate 1500 may be provided to protect any component of the electrophoretic display panel 1000. In particular, the protective plate 1500 may be provided to protect the electrophoretic layer 1400. Here, the protective plate 1500 may also be referred to as a protective sheet.

The protective plate 1500 may be arranged between the second electrode 1300 and the door body 110. The protective plate 1500 may be arranged between the second electrode 1300 and the base 111. The protective plate 1500 may be coupled to the coupling portion 112.

The protective plate 1500 may be disposed behind the second electrode 1300 and may be disposed in front of the door body 110.

For example, the protective plate 1500 may be attached to a rear surface of the second electrode 1300. In particular, the protective plate 1500 may be attached to the rear surface of the second electrode 1300 by a third adhesive layer ad3. The ad3 may include an optical adhesive material configured to be light transmissive, including materials, such as an acrylic, silicone, or urethane-based material, but is not limited thereto. For example, the ad3 may include various adhesive materials although light is not transmissive.

The protective plate 1500 may include a material with high rigidity. For example, the protective plate 1500 may include a metal material, such as electro galvanized iron (EGI). Alternatively, for example, the protective plate 1500 may include various materials, such as stainless steel, aluminum, plastic, and polymer film.

With the above configurations, the protective plate 1500 may distribute a load transmitted from the coupling portion 112 to the electrophoretic display panel 1000. The protective plate 1500 may prevent the electrophoretic display panel 1000 from being damaged, and improve the durability or life of a product. In addition, the protective plate 1500 may improve adhesion between the electrophoretic layer 1400 and the electrodes 1200 and 1300.

The home appliance 1 may include a sealing member 1600 provided along an edge of the electrophoretic display panel 1000. The sealing member 1600 may cover at least a portion of the edge of the electrophoretic display panel 1000.

More specifically, the sealing member 1600 may cover at least a portion of each outer edge of the first electrode 1200, the second electrode 1300, and the electrophoretic layer 1400.

In addition, the sealing member 1600 may also cover at least a portion of an outer edge of the protective plate 1500.

The plate 1100 may include a stepped portion 1100a extending outward from the edge of each of the first electrode 1200, the second electrode 1300, and the electrophoretic layer 1400. For example, the stepped portion 1100a may be formed along an outer edge of the plate 1100.

In addition, the stepped portion 1100a may be formed to extend in an outward direction from the edge than the protective plate 1500.

In FIG. 5, the stepped portion 1100a has been shown to extend further in a Z direction than each of the first electrode 1200, the second electrode 1300, the electrophoretic layer 1400, and the protective plate 1500, but is not limited thereto. For example, the stepped portion may be formed to extend in both a Y direction and the Z direction.

The sealing member 1600 may cover the first electrode 1200, the second electrode 1300, the electrophoretic layer 1400, and the protective plate 1500 in the Y direction and the Z direction, which are edge directions, respectively. In other words, the sealing member 1600 may cover a side surface representing the Y direction and a side surface representing the Z direction of each of the first electrode 1200, the second electrode 1300, the electrophoretic layer 1400, and the protective plate 1500.

The sealing member 1600 may be disposed behind the stepped portion 1100a. The sealing member 1600 may be attached to a rear surface of the stepped portion 1100a. As shown in FIG. 5, the sealing member 1600 may be provided to entirely cover the rear of the stepped portion 1100a. The sealing member 1600 may compensate for each step formed between the plate 1100 and the first electrode 1200, the second electrode 1300, the electrophoretic layer 1400, and the protective plate 1500, respectively, by the stepped portion 1100a.

For example, the sealing member 1600 may include various types of polymer materials, such as urethane materials.

The sealing member 1600 may seal a gap between each layer of the electrophoretic display panel 1000, for example the plate 1100, the first electrode 1200, the second electrode 1300, the electrophoretic layer 1400, and the protective plate 1500, thereby preventing moisture, foreign substances, etc. from entering the electrophoretic display panel 1000.

The sealing member 1600 may prevent the electrophoretic display panel 1000 from being damaged and improve the durability or life of a product.

Meanwhile, FIG. 5 is a view illustrating the electrophoretic display panel 1000 of the home appliance 1 according to an embodiment of the disclosure for ease of explanation. Accordingly, the thickness ratio in the X direction in which each layer of the electrophoretic display panel 1000 is stacked and formed is not limited as shown in FIG. 5.

For example, the plate 1100 may have a thickness of about 3.2 mm, the first electrode 1200 may have a thickness of about 130 micrometers, and the second electrode 1300 may have a thickness of about 50 micrometers. Additionally, the electrophoretic layer 1400 may have a thickness of about 25 to 30 micrometers. Additionally, the protective plate 1500 may have a thickness of about 0.1 to 3.0 mm, preferably, have a thickness of about 0.5 mm. Additionally, the ad1 may have a thickness of about 20 micrometers, the ad2 may have a thickness of about 25 micrometers, and the ad3 may have a thickness of about 35 micrometers.

However, each of the above thicknesses is not limited thereto, and components constituting each layer of the electrophoretic display panel 1000 may be formed to have different thicknesses.

Figure 8:
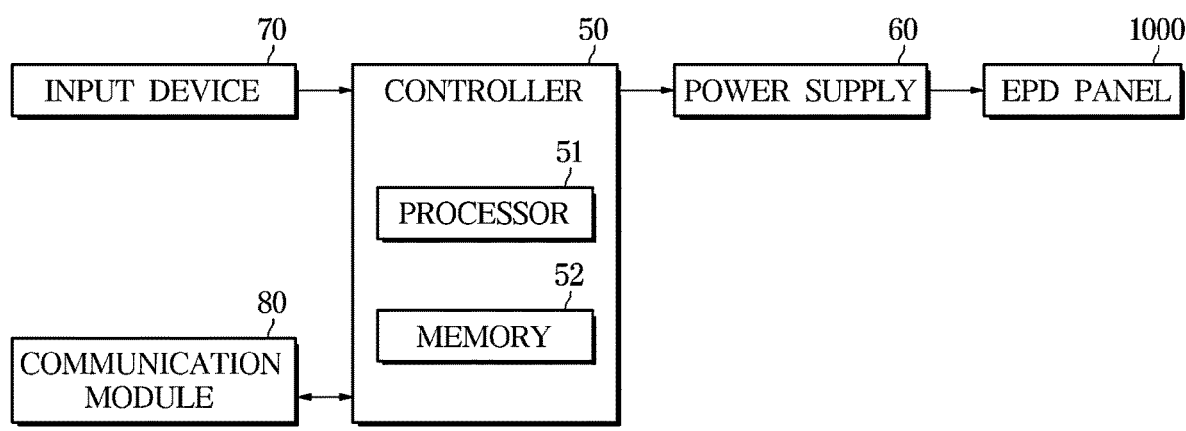
FIG. 8 is a block diagram showing some configurations of a home appliance according to an embodiment of the disclosure.

FIG. 8 is a block diagram showing some configurations of a home appliance according to an embodiment of the disclosure.

Referring to FIG. 8, the home appliance 1 may include an input device 70. The input device 70 may receive a user input. The input device 70 may include a plurality of input buttons. Different input buttons of the input device 70 may obtain different user inputs. For example, the input device 70 may receive a command from a user for a type of color mode. More specifically, the input device 70 may receive a design change command or a color change command from the user. In addition, the input device 70 may receive an input regarding an operating mode or an operating temperature of the home appliance 1.

The input device 70 may receive the user input and output an electrical signal (voltage or current) corresponding to the user input to the processor 51. The processor 51 may receive the user input based on an output signal of the input device 70.

The input device 70 may include various types of input devices, such as a tact switch, a push switch, a slide switch, a toggle switch, a micro switch, a touch switch, or the like.

The home appliance 1 may include a communication module 80 that communicates with an external electronic device. For example, the communication module 80 may include a wireless communication module for communicating with an external electronic device.

The communication module 80 may communicate with an external electronic device so that the external electronic device may receive a command for the type of color mode input from the user. In other words, the communication module 80 communicates with the external electronic device so that the external electronic device may receive a design change command or color change command input from the user.

The external electronic device that communicates with the communication module 80 may include, for example, an external user terminal device (e.g., smart phone, etc.). In addition, the communication module 80 may communicate with an external server.

For example, the communication module 80 may include a transceiver configured to transmit a signal to an external electronic device and receive a signal from the external electronic device.

The home appliance 1 may include a power supply 60 configured to supply drive power to the electrophoretic display panel 1000. The power supply 60 may apply power to the electrophoretic display panel 1000.

More specifically, the power supply 60 may be electrically connected to the first electrode 1200 and the second electrode 1300 of the electrophoretic display panel 1000, respectively, and may apply or not apply a potential difference between the first electrode 1200 and the second electrode 1300 based on electrical signals received from the processor 51

The home appliance 1 may include a controller 50 that controls various components of the home appliance 1.

The controller 50 includes a processor 51 that generates control signals associated with an operation of the home appliance 1 and a memory 52 that stores programs, applications, instructions, and/or data for the operation of the home appliance 1. The processor 51 and the memory 52 may be implemented as separate semiconductor devices or as a single semiconductor device.

In addition, the controller 50 may include a plurality of processors or a plurality of memories. The controller 50 may be located at different locations within the home appliance 1. For example, the controller 50 may be included in a printed circuit board (PCB) provided in an electrical unit (not shown) of the home appliance 1.

The processor 51 may include an arithmetic circuit, a memory circuit, and a control circuit. The processor 51 may include one chip or a plurality of chips. In addition, the processor 51 may include one core or a plurality of cores.

The processor 51 may be electrically connected to the memory 52. The processor 51 may be electrically connected to the input device 70. The processor 51 may be electrically connected to the communication module 80. The processor 51 may be electrically connected to the power supply 60 and the electrophoretic display panel 1000. In particular, the processor 51 may be electrically connected to the pair of electrodes 1200 and 1300 via the power supply 60.

The processor 51 may process data and/or signals by using a program provided from the memory 52 and transmit control signals to each component of the home appliance 1 based on the processing result. For example, the processor 51 may process a signal received for the color mode and control the electrophoretic display panel 1000 based on the processed signal. More specifically, the processor 51 may process the user input received through the input device 70 of the home appliance 1 or the user input received through the communication module 80 from an external electronic device. The processor 51 may output control signals for controlling each component of the home appliance 1, such as the electrophoretic display panel 1000 and the power supply 60, based on the electrical signal corresponding to the received color mode.

Each component of the home appliance 1, such as the electrophoretic display panel 1000 and the power supply 60 may be operated on the basis of control signals from the processor 51.

The memory 52 may store various programs and data required for control and may temporarily store temporary data generated during control.

The memory 52 may include a volatile memory, such as static random access memory (S-RAM) and dynamic random access memory (D-RAM), and a non-volatile memory, such as read only memory (ROM) and erasable programmable read only memory (EPROM). The memory 52 may include one memory element or may include a plurality of memory elements.

Hereinafter, controlling an operation of the electrophoretic display panel 1000 by the processor 51 of the home appliance 1 will be described in more detail with reference to FIG. 9 and FIG. 10.

Figure 9:
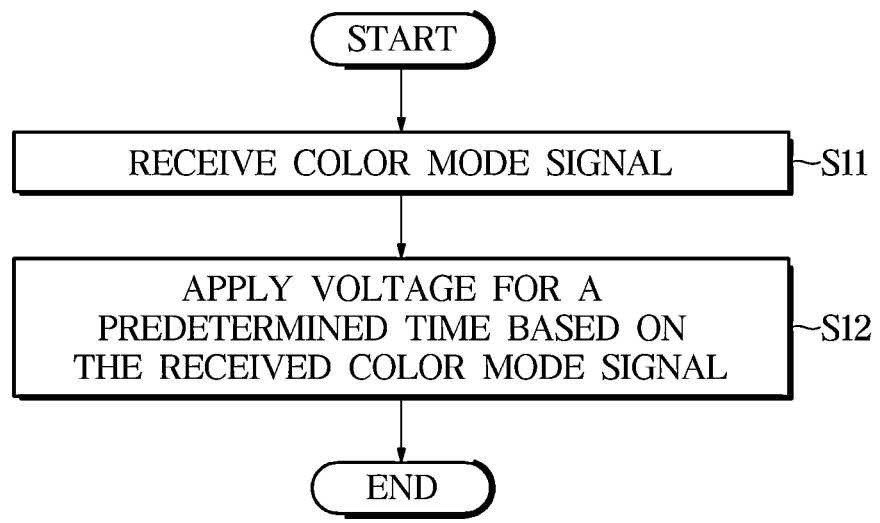
FIG. 9 is a flowchart illustrating an example of an operation of an electrophoretic display panel of a home appliance according to an embodiment of the disclosure.

FIG. 9 is a flowchart illustrating an example of an operation of an electrophoretic display panel of a home appliance according to an embodiment of the disclosure.

Referring to FIG. 9, a method of controlling the electrophoretic display panel 1000 of the home appliance 1 according to an embodiment of the disclosure may include receiving an electrical signal corresponding to a color mode (operation S11). More specifically, the processor 51 may receive an electrical signal corresponding to the first color mode or an electrical signal corresponding to the second color mode. For example, the input device 70 may obtain the user input for the color mode selected by the user from among the first color mode and the second color mode, and the processor 51 may receive the electrical signal corresponding to the first color mode or the electrical signal corresponding to the second color mode from the input device 70. Alternatively, the communication module 80 may communicate with the external electronic device so that the external input device may receive the user input obtained for the color mode selected by the user from among the first color mode and the second color mode, and the processor 51 may receive the electrical signal corresponding to the first color mode or the electrical signal corresponding to the second color mode from the communication module 80.

Then, a method of controlling the electrophoretic display panel 1000 of the home appliance 1 may include applying a voltage between the first electrode 1200 and the second electrode 1300 based on the electrical signal corresponding to the received color mode (operation S12). More specifically, the processor 51 may control the power supply 60 to apply a voltage between the first electrode 1200 and the second electrode 1300 based on the electrical signal corresponding to the received color mode.

For example, the processor 51 may control the power supply 60 so that the first charged particles 1430 flow toward the first electrode 1200 in response to the electrical signal corresponding to the first color mode being received. In other words, the processor 51 may control the pair of electrodes 1200 and 1300 of the electrophoretic display panel 1000 so that the first charged particles 1430 flow in a direction adjacent to the plate 1100 and the second charged particles 1440 flow in a direction adjacent to the base 111 in response to the electrical signal corresponding to the first color mode being received.

At this time, an electric field may be generated between the first electrode 1200 and the second electrode 1300 so that the first charged particles 1430 flow toward the first electrode 1200 and the second charged particles 1440 flow toward the second electrode 1300. More specifically, a charge opposite to that of the first charged particles 1430 may be charged on the first electrode 1200, and a charge opposite to that of the second charged particles 1440 may be charged on the second electrode 1300.

Conversely, for example, the processor 51 may control the power supply 60 so that the second charged particles 1440 flow toward the first electrode 1200 in response to the electrical signal corresponding to the second color mode being received. In other words, the processor 51 may control the pair of electrodes 1200 and 1300 of the electrophoretic display panel 1000 so that the second charged particles 1440 flow in a direction adjacent to the plate 1100 and the first charged particles 1430 flow in a direction adjacent to the base 111 in response to the electrical signal corresponding to the second color mode being received.

At this time, an electric field may be generated between the first electrode 1200 and the second electrode 1300 so that the second charged particles 1440 flow toward the first electrode 1200 and the first charged particles 1430 flow toward the second electrode 1300. More specifically, a charge opposite to that of the second charged particles 1440 may be charged on the first electrode 1200, and a charge opposite to that of the first charged particles 1430 may be charged on the second electrode 1300.

In detail, the applying of the voltage between the first electrode 1200 and the second electrode 1300 based on the electrical signal corresponding to the received color mode (operation S12) may be performed to apply the voltage only for a predetermined time. In other words, upon receipt of the electrical signal corresponding to the first color mode or the second color mode, the processor 51 may control the power supply 60 so that the voltage is applied between the first electrode 1200 and the second electrode 1300 for a predetermined time and is not applied after the predetermined time has elapsed.

Here, the predetermined time may be set experimentally or empirically, and data for the predetermined time may be stored in the memory 52.

Therefore, power consumption required to maintain the changed color mode after changing the color mode of the electrophoretic display panel 1000 may be reduced.

Figure 10:
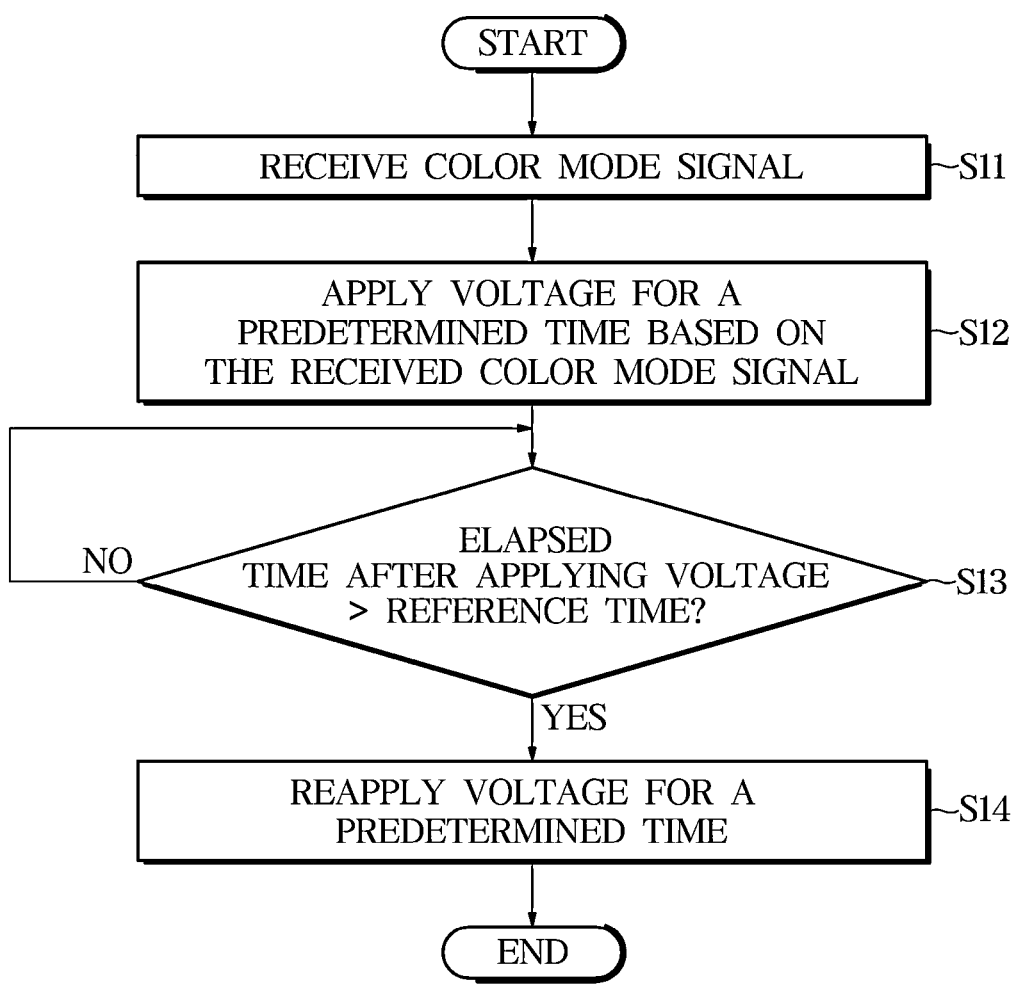
FIG. 10 is a flowchart illustrating an example of an operation of an electrophoretic display panel of a home appliance according to an embodiment of the disclosure.

FIG. 10 is a flowchart illustrating an example of an operation of an electrophoretic display panel of a home appliance according to an embodiment of the disclosure.

Referring to FIG. 10, a method of controlling an operation of the electrophoretic display panel 1000 of the home appliance 1 according to an embodiment of the disclosure includes determining whether a time elapsed after applying the voltage between the first electrode 1200 and the second electrode 1300 for a predetermined time exceeds a reference time based on the signal corresponding to the received color mode (operation S13).

Even though the charged particles 1430 and 1440 are rearranged within the color cell 1410 by applying the voltage between the first electrode 1200 and the second electrode 1300 only for the predetermined time based on the signal corresponding to the received color mode, the arrangement of the charged particles 1430 and 1440 may be maintained due to bistability as described above. Nonetheless, when a state in which no voltage is applied between the first electrode 1200 and the second electrode 1300 exceeds the reference time, the arrangement of the charged particles 1430 and 1440 within the color cell 1410 may not be properly maintained. This may affect the color mode provided by the electrophoretic display panel 1000.

Accordingly, a method of controlling the operation of the electrophoretic display panel 1000 of the home appliance 1 includes, upon determining that the time elapsed after applying the voltage between the first electrode 1200 and the second electrode 1300 exceeds the reference time (Yes in operation S13), reapplying the voltage for a predetermined time (operation S14). In other words, the processor 51 may control the power supply 60 to reapply the voltage between the first electrode 1200 and the second electrode 1300 for a predetermined time based on the time elapsed after the applying of the voltage between the first electrode 1200 and the second electrode 1300 exceeding the reference time.

Although not explicitly shown in FIG. 10, the above operations S13 and S14 may be repeatedly performed when a signal for color mode change is not received.

The reference time may be set experimentally or empirically, and data for the reference time may be stored in the memory 52.

As such, the method of controlling the operation of the electrophoretic display 1000 described above with reference to FIG. 9 and FIG. 10 is an example of a method of changing and maintaining a color mode of an electrophoretic display panel of a home appliance according to the spirit of the disclosure, and the spirit of the disclosure is not limited thereto.

Figure 11:
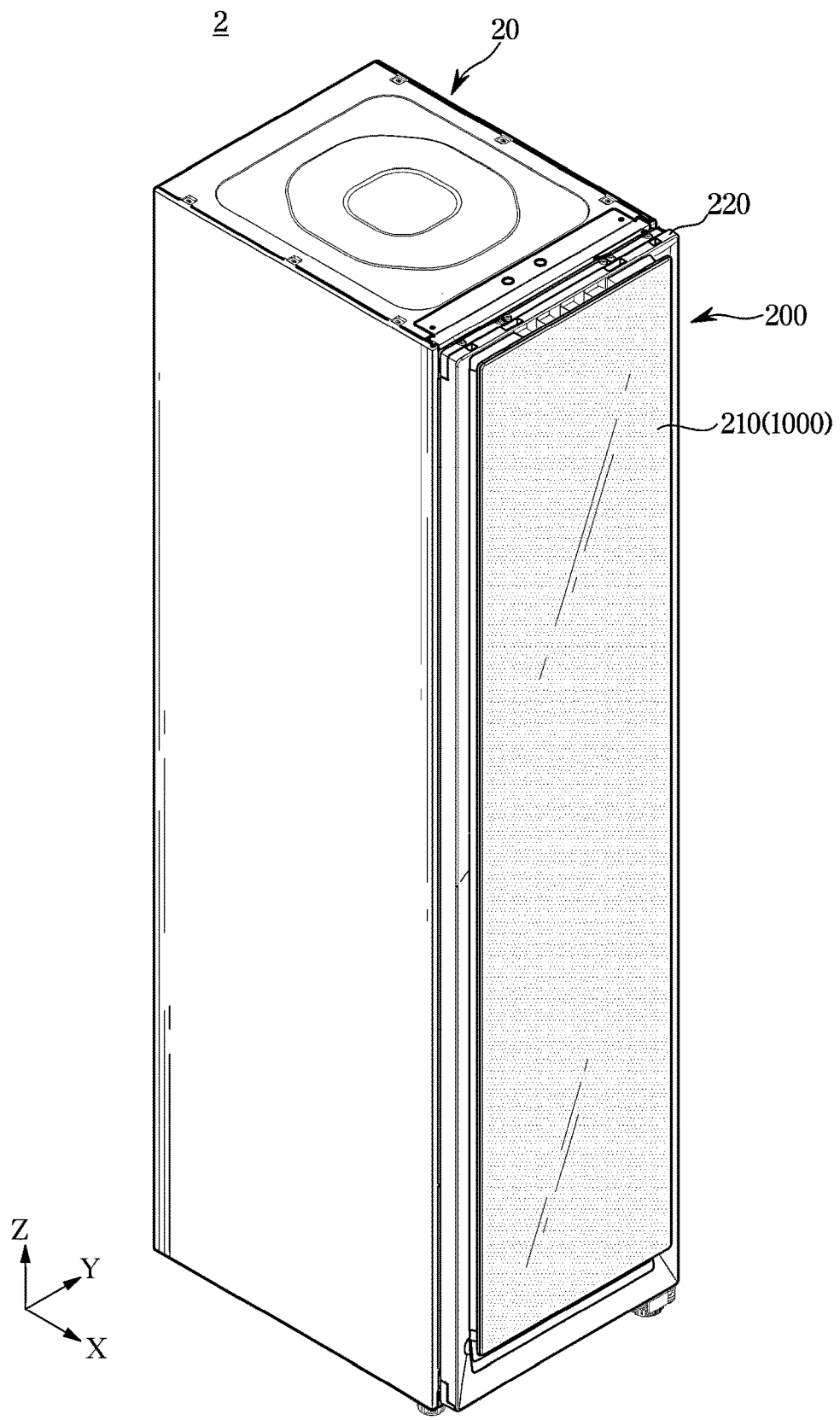
FIG. 11 is a perspective view illustrating a clothes care device that is a type of home appliance according to an embodiment of the disclosure.

FIG. 11 is a perspective view illustrating a clothes care appliance that is a type of home appliance according to an embodiment of the disclosure.

Referring to FIG. 11, a clothes care appliance 2, which is a type of home appliance according to an embodiment of the disclosure, may include a main body 20 forming an exterior and a door 200 rotatably coupled to the main body 20. The clothes care appliance 2 may include a clothes management room provided inside the main body 20 to receive clothes, a clothes support member (not shown) provided inside the clothes management room to hold clothes, a machine room (not shown) equipped with a heat exchanger (not shown) provided to dehumidify or heat air inside the clothing management compartment.

The door 200 may open and close the clothes management room provided inside the main body 20. The door 200 may include a door panel 210 and a door body 220. The door panel 210 may be coupled to the door body 220.

As shown in FIG. 11, the door panel 210 may be disposed in front of the door body 220. The door panel 210 may be coupled to a front surface of the door body 220. The door panel 210 may form a front exterior of the door 200.

Here, the direction of each component of the door 200 is defined based on when the door 200 is in a position to close the clothes management room. For example, "a front of the door body 220" means a front of the clothes care appliance 2 in the X direction when the door 200 is in a position to close the clothes management room. Also, for example, "a front side of the door 200" means one side of the door 200 that is visible to the user when the door 200 is in a position to close the clothes management room.

The door body 220 may include a base and a coupling portion protruding from the base, similar to the door body 110 of the refrigerator 1 described in FIG. 1 to FIG. 10.

For example, the door panel 210 may be formed to have a substantially flat plate shape. Correspondingly, the front surface of the door body 220 to which the door panel 210 is coupled may have a substantially flat plate shape.

The door panel 210 may be coupled to the door body 220 by various known methods.

The door panel 210 may include the electrophoretic display panel 1000. The door panel 210 including the electrophoretic display panel 1000 may display different designs or colors based on a user input. Alternatively, the door panel 210 including the electrophoretic display panel 1000 may display different designs or colors based on an operating condition of the clothes care appliance 2.

The electrophoretic display panel 1000 and the method of controlling the electrophoretic display panel 1000 are the same as those described with reference to FIG. 1 to FIG. 10, and thus detailed descriptions thereof will be omitted.

Figure 12:
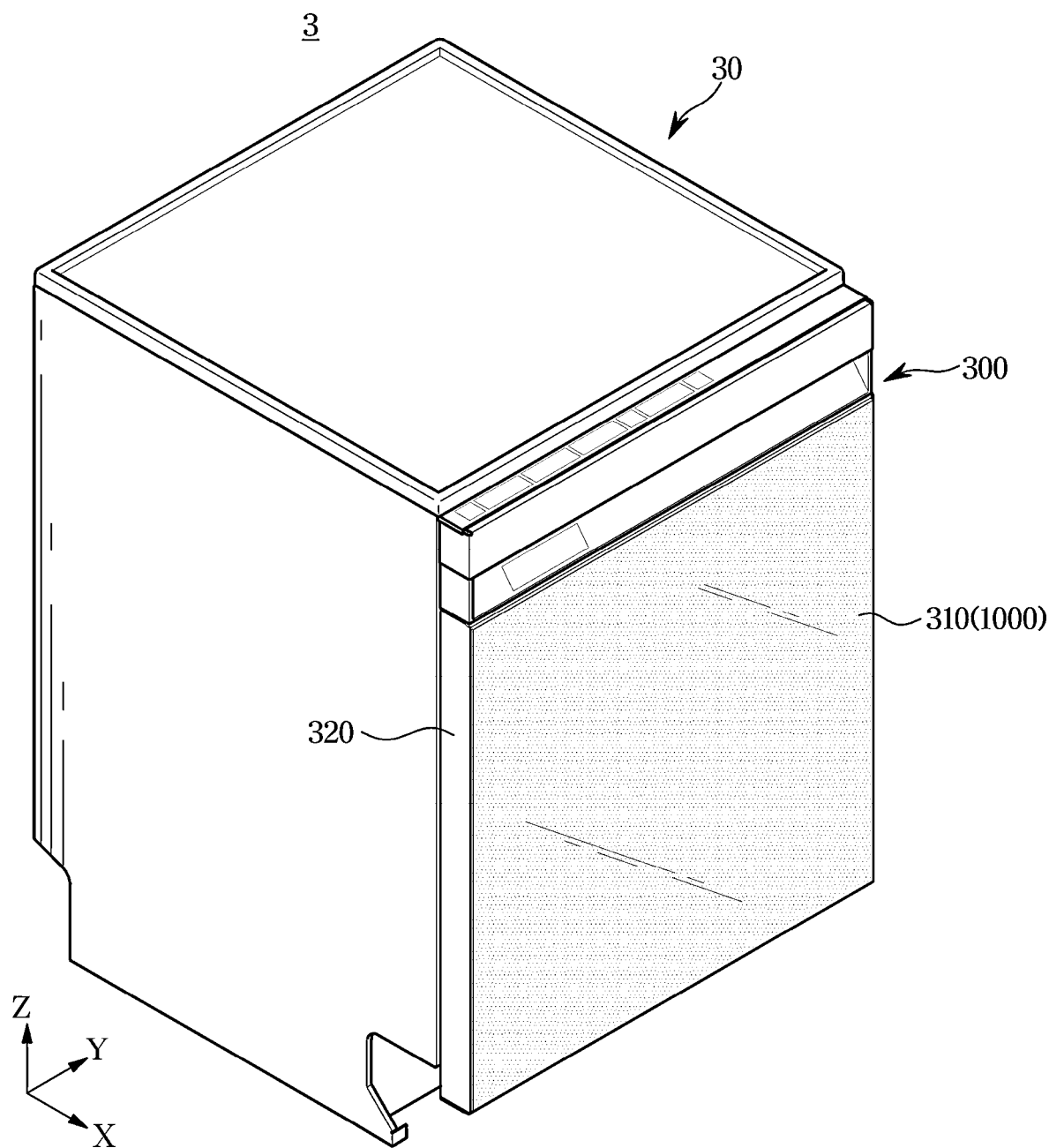
FIG. 12 is a perspective view illustrating a dishwasher that is a type of home appliance according to an embodiment of the disclosure.

FIG. 12 is a perspective view illustrating a dishwasher that is a type of home appliance according to an embodiment of the disclosure.

Referring to FIG. 12, a dishwasher 3, which is a type of home appliance according to an embodiment of the disclosure, may include a main body 30 forming an exterior and a door 300 rotatably coupled to the main body 30.

A washing room (not shown) for receiving dishes may be provided inside the main body 30. The dishwasher 3 may include various parts, such as a plurality of nozzles for washing dishes received in the washing room, a driving device for driving the plurality of nozzles, and a controller for controlling the driving device.

The door 300 may open and close the washing room provided inside the main body 30. The door 300 may include a door panel 310 and a door body 320. The door panel 310 may be coupled to the door body 320.

As shown in FIG. 12, the door panel 310 may be disposed in front of the door body 320. The door panel 310 may be coupled to a front surface of the door body 320. The door panel 310 may form a front exterior of the door 300.

Here, the direction of each component of the door 300 is defined based on when the door 300 is in a position to close the washing room. For example, "a front of the door body 320" means a front of the dishwasher 3 in the X direction when the door 300 is in a position to close the washing room. Also, for example, "a front side of the door 300" means one side of the door 300 that is visible to the user when the door 300 is in a position to close the washing room.

The door body 320 may include a base and a coupling portion protruding from the base, similar to the door body 110 of the refrigerator 1 described in FIG. 1 to FIG. 10.

For example, the door panel 310 may be formed to have a substantially flat plate shape. Correspondingly, the front surface of the door body 320 to which the door panel 310 is coupled may have a substantially flat plate shape.

The door panel 310 may be coupled to the door body 320 by various known methods.

The door panel 310 may include the electrophoretic display panel 1000. The door panel 310 including the electrophoretic display panel 1000 may display different designs or colors based on a user input. Alternatively, the door panel 310 including the electrophoretic display panel 1000 may display different designs or colors based on an operating condition of the dishwasher 3.

The electrophoretic display panel 1000 and the method of controlling the electrophoretic display panel 1000 are the same as those described with reference to FIG. 1 to FIG. 10, and thus detailed descriptions thereof will be omitted.

Figure 13:
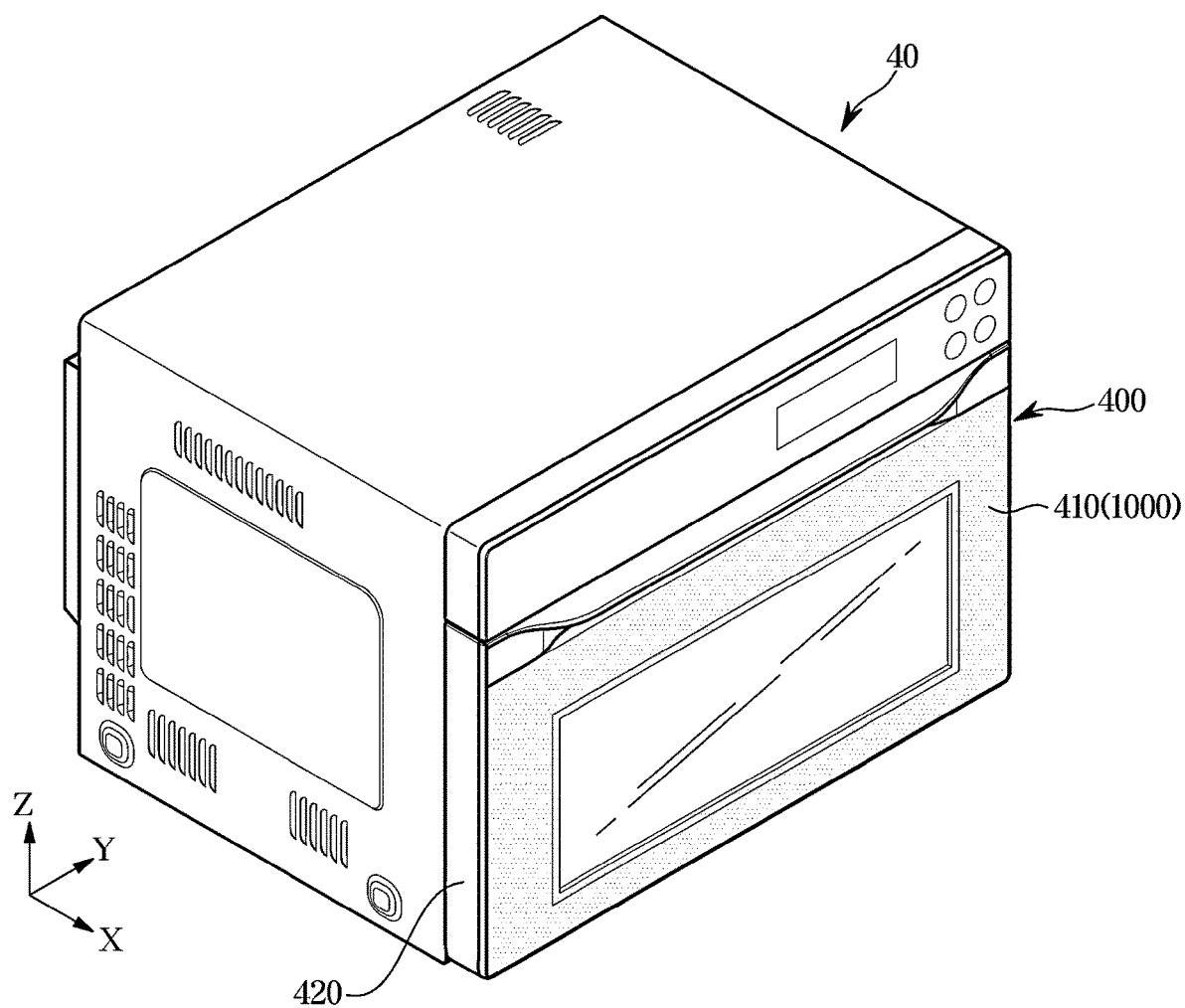
FIG. 13 is a perspective view illustrating a cooking appliance that is a type of home appliance according to an embodiment of the disclosure.

FIG. 13 is a perspective view illustrating a cooking appliance that is a type of home appliance according to an embodiment of the disclosure.

Referring to FIG. 13, a cooking appliance 4, which is a type of home appliance according to an embodiment of the disclosure, may include a main body 40 forming an exterior and a door 400 rotatably coupled to the main body 40.

A cooking room (not shown) for receiving ingredients may be provided inside the main body 40. The cooking appliance 4 includes various parts, such as a heater, a heating wire, a fan, and a controller for heating and cooking the ingredients received in the cooking room.

The door 400 may open and close the cooking room provided inside the main body 40. The door 400 may include a door panel 410 and a door body 420. The door panel 410 may be coupled to the door body 420.

As shown in FIG. 13, the door panel 410 may be disposed in front of the door body 420. The door panel 410 may be coupled to a front surface of the door body 420. The door panel 410 may form a front exterior of the door 400.

Here, the direction of each component of the door 400 is defined based on when the door 400 is in a position to close the cooking room. For example, "a front of the door body 420" means a front of the cooking appliance 4 in the X direction when the door 400 is in a position to close the cooking room. Also, for example, "a front side of the door 400" means one side of the door 400 that is visible to the user when the door 400 is in a position to close the cooking room.

The door body 420 may include a base and a coupling portion protruding from the base, similar to the door body 110 of the refrigerator 1 described in FIG. 1 to FIG. 10.

For example, the door panel 410 may be formed to have a substantially flat plate shape. Correspondingly, the front surface of the door body 420 to which the door panel 410 is coupled may have a substantially flat plate shape.

The door panel 410 may be coupled to the door body 420 by various known methods.

The door panel 410 may include the electrophoretic display panel 1000. The door panel 410 including the electrophoretic display panel 1000 may display different designs or colors based on a user input. Alternatively, the door panel 410 including the electrophoretic display panel 1000 may display different designs or colors based on an operating condition of the cooking appliance 4.

In an example of the disclosure, the cooking appliance 4 is an oven, but an induction heating appliance, which heats a cooking vessel placed on a plate using magnetic induction, may also be included in the cooking appliance 4 according to an embodiment. When the cooking appliance 4 is implemented by induction heating, the electrophoretic display panel 1000 may be adapted to a control panel or plate on which a user interface is provided.

The electrophoretic display panel 1000 and the method of controlling the electrophoretic display panel 1000 are the same as those described with reference to FIG. 1 to FIG. 10, and thus detailed descriptions thereof will be omitted.

Figure 14:
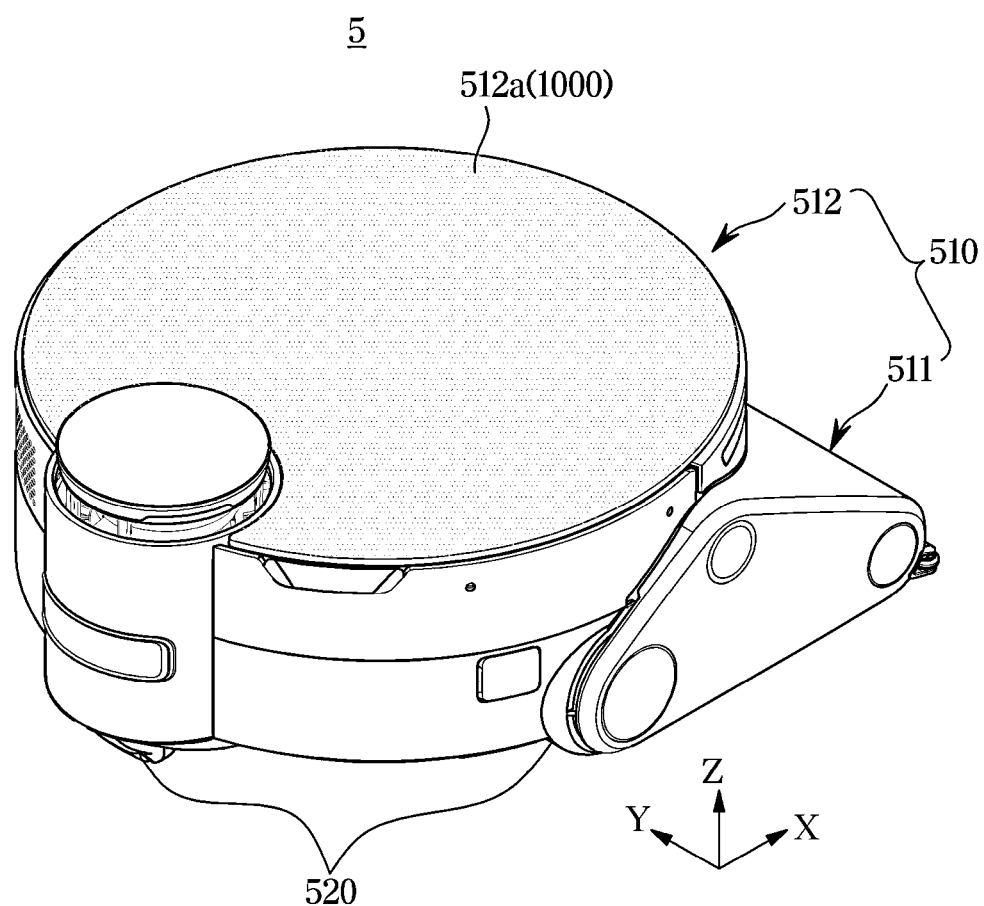
FIG. 14 is a perspective view illustrating a robot cleaner that is a type of home appliance according to an embodiment of the disclosure.

FIG. 14 is a perspective view illustrating a robot cleaner that is a type of home appliance according to an embodiment of the disclosure.

Referring to FIG. 14, a home appliance according to an embodiment of the disclosure may include a robot cleaner 5.

The robot cleaner 5 is a device that cleans dust and the like accumulated on a floor while driving in a cleaning area without user manipulation. The robot cleaner 5 may clean the cleaning area without omission by controlling a driving device and efficiently remove dust and the like by controlling the cleaning device.

More specifically, the robot cleaner 5 may include a cleaner body 510 and a drive unit 520 provided to travel in the cleaning area.

The cleaner body 510 forms an exterior of the robot cleaner 5 and may accommodate various parts of the robot cleaner 5. For example, the cleaner body 510 may include a brush (not shown) for suctioning foreign substances on a surface to be cleaned, a suction motor (not shown) for generating suction force, a filter (not shown), a dust collecting container (not shown), a battery (not shown), and the like.

The drive unit 520 may be coupled to the cleaner body 510, and include at least one wheel to travel in a cleaning area. The wheel of the drive unit 520 may be rotatably provided by a drive motor (not shown). The drive motor may be controlled by a processor of the robot cleaner 5.

The cleaner body 510 may include a first case 511 provided to which the drive unit 520 is coupled and to suction foreign substances on a surface to be cleaned by generating a suction force, and a second case 512 provided to cover an upper portion of the first case 511.

The brush, motor, filter, dust collecting container, battery, and the like of the robot cleaner 5 described above may be accommodated in the first case 511.

The second case 512 may form an upper surface of the cleaner body 510. As shown in FIG. 14, the second case 512 may have a substantially flat outer surface. However, the shape of the second case 512 is not limited thereto, and for example, the second case 512 may include a curved shape on at least a portion of an outer surface thereof.

Although FIG. 14 shows that the first case 511 and the second case 512 are separated from each other, it is not limited thereto. Alternatively, the first case 511 and the second case 512 may be integrally formed.

For example, the second case 512 of the robot cleaner 5 may include a case body and an upper panel 512a mounted on the case body. The upper panel 512a may form at least a portion of the upper surface of the robot cleaner 5. The case body may support the upper panel 512a from the lower side. The upper panel 512a may be coupled to the case body in various known ways.

The case body may include a base and a coupling portion protruding from the base, similar to the door body 110 of the refrigerator 1 described in FIG. 1 to FIG. 10. The upper panel 512a may be coupled to the coupling portion. The base may face a lower surface of the upper panel 512a.

For example, the upper panel 512a may be formed to have a substantially flat plate shape.

The upper panel 512a may include the electrophoretic display panel 1000. The door panel 410 including the electrophoretic display panel 1000 may display different designs or colors based on a user input. Alternatively, the upper panel 512a including the electrophoretic display panel 1000 may display different designs or colors based on an operating condition of the robot cleaner 5.

Each layer of the electrophoretic display panel 1000 adapted to the upper panel 512a of the robot cleaner 5 may be arranged in the Z direction, which is a vertical direction of the robot cleaner 5. A relationship in which each layer of the electrophoretic display panel 1000 adapted to the upper panel 512a of the robot cleaner 5 is arranged in the Z direction is the same as a relationship in which each layer of the electrophoretic display panel 1000 adapted to the door panel 120 of the refrigerator 1 described in FIG. 1 to FIG. 10 is arranged in the X direction. For example, the electrophoretic display panel 1000 adapted to the upper panel 512a of the robot cleaner 5 may include the plate, the first electrode, the electrophoretic layer, the second electrode, which are placed in the order from top to bottom in the Z direction. The sealing member of the electrophoretic display panel 1000 may be disposed along its edge.

Unlike shown in FIG. 14, the electrophoretic display panel 1000 may be employed on an outer circumferential surface of the second case 512 or on a panel of an outer surface of the first case 511.

The electrophoretic display panel 1000 and the method of controlling the electrophoretic display panel 1000 are the same as those described with reference to FIG. 1 to FIG. 10, and thus detailed descriptions thereof will be omitted.

Embodiments of the disclosure may provide a home appliance including a main body, a door opening and closing the main body, and an EPD panel configured to cover a base from the outside, the base being included in at least one of the main body and the door, wherein the EPD panel includes a plate forming an outer surface of the EPD panel configured to transmit light, a first electrode arranged between the plate and the base, and configured to transmit light, a second electrode arranged between the first electrode and the base, and facing the first electrode, an electrophoretic layer arranged between the first electrode and the second electrode, and including a color cell in which first charged particles having a first color and second charged particles having a second color different from the first color are flowably accommodated, the second charged particles having a charge different from that of the first charged particles, and a protective plate arranged between the second electrode and the base to protect the electrophoretic layer.

The home appliance may further include a coupling portion protruding outward from the base, and the protective plate may be coupled to the coupling portion, and configured to distribute a load transmitted from the coupling portion to the EPD panel.

The EPD panel may further include a sealing member disposed along an edge of the EPD panel and configured to cover at least a portion of each edge of the first electrode, the second electrode, the electrophoretic layer, and the protective plate.

Embodiments of the disclosure may provide a home appliance including an EPD panel forming an exterior of the home appliance and a base on which the EPD panel is mounted, wherein the EPD panel includes a plate positioned outwardly of the base and configured to transmit light, a pair of electrodes arranged between the plate and the base, an electrophoretic layer arranged between the pair of electrodes and including a color cell in which first charged particles having a first color and second charged particles having a color different from the first color and a charge different from that of the first charged particles are flowably accommodated, and a sealing member disposed along an edge of the EPD panel.

The plate may include a stepped portion extending outwardly from the edge of each of the pair of electrodes and the electrophoretic layer, and the sealing member may be disposed behind the stepped portion and configured to cover an outer edge of each of the pair of electrodes and the electrophoretic layer.

Meanwhile, the disclosed embodiments may be implemented in the form of a recording medium storing instructions executable by a computer. Instructions may be stored in the form of program codes, and when executed by a processor, may create program modules to perform operations of the disclosed embodiments. The recording medium may be implemented as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Also, the computer-readable recording medium may be provided in the form of a non-transitory storage medium. Here "non-transitory storage medium" means that the storage medium is a tangible device and does not contain a signal (for example, electromagnetic wave), and this term does not distinguish the case in which data is semi-permanently stored in the storage medium, from the case in which data is temporarily stored. For example, a non-temporary transitory storage medium may include a buffer in which data is temporarily stored.

According to one embodiment, the method according to various embodiments disclosed herein may be provided by being included in a computer program product. Computer program products may be traded between sellers and buyers as commodities. Computer program products may be distributed in the form of a storage medium (for example, compact disc read only memory (CD-ROM)), readable by a device. Alternatively, computer program products may be distributed (for example, downloaded or uploaded) online through an application store (for example, Play Store™) or directly distributed between two user devices (for example, smart phones). In the case of online distribution, at least a portion of the computer program product (for example, downloadable app) may be temporarily stored or created temporarily in a storage medium readable by a device, such as the manufacturer's server, the application store's server, or the relay server's memory.

Although few embodiments of the disclosure have been shown and described, the above embodiment is illustrative purpose only, and it would be appreciated by those skilled in the art that changes and modifications may be made in these embodiments without departing from the principles and scope of the disclosure, the scope of which is defined in the claims and their equivalents.

What is claimed is:

1. A home appliance, comprising:
a main body; and
a door configured to open and close the main body, the door including:
  a door body, and
  an electrophoretic display (EPD) panel disposed on a front side of the door body, the EPD panel including:
    a plate configured to cover at least a portion of the front side of the door body and to allow light to pass through,
    a first electrode between the plate and the door body and configured to allow light to pass through,
    a second electrode between the first electrode and the door body so as to face the first electrode,
    an electrophoretic layer between the first electrode and the second electrode, and including a color cell in which first charged particles having a first color and second charged particles having a second color different from the first color are accommodated, the first charged particles and the second charged particles being flowable within the color cell, the second charged particles having a different charge than the first charged particles, and
    a protective plate attached to a rear surface of the second electrode and including a material different from a material of the plate, and
  a coupling portion coupling the protective plate to the front side of the door body, the coupling portion extending between the protective plate and the front side of the door body so as to contact a portion of the protective plate that is less than an entirety of the protective plate,
  wherein the material included in the protective plate has a higher rigidity than the second electrode and the electrophoretic layer so as to distribute a load transmitted from the coupling portion to the electrophoretic layer, and
  wherein the plate, the first electrode, the electrophoretic layer, the second electrode, and the protective plate are stacked in a stacking direction, and the coupling portion is coupled to a rear surface of the protective plate in the stacking direction.

2. The home appliance of claim 1, wherein
the coupling portion is tapered in a direction of the protective plate.

3. The home appliance of claim 2, wherein
the door body includes a base facing the protective plate, and
the coupling portion protrudes from the base.

4. The home appliance of claim 1, wherein
the protective plate includes a metal material having high rigidity.

5. The home appliance of claim 1, wherein
the EPD panel includes a sealing member disposed along an edge of the EPD panel and configured to cover at least a portion of the edge of the EPD panel.

6. The home appliance of claim 5, wherein
the sealing member is configured to cover outer edges of each of the first electrode, the second electrode, and the electrophoretic layer.

7. The home appliance of claim 5, wherein
the plate includes a stepped portion extending outwardly from an edge of each of the first electrode, the second electrode, and the electrophoretic layer, and
the sealing member is disposed behind the stepped portion.

8. The home appliance of claim 7, wherein
the sealing member is configured to entirely cover a rear side of the stepped portion.

9. The home appliance of claim 7, wherein
the stepped portion extends further in an outward direction than an outer edge of the protective plate, and
the sealing member is configured to cover the outer edge of the protective plate.

10. The home appliance of claim 1, further comprising
a power supply configured to apply a voltage between the first electrode and the second electrode; and
a processor configured to control an operation of the power supply,
wherein the processor is configured to:
  control the power supply to apply a first voltage between the first electrode and the second electrode so that the first charged particles flow toward the first electrode based on receiving an electrical signal corresponding to a first color mode, and
  control the power supply to apply a second voltage between the first electrode and the second electrode so that the second charged particles flow toward the first electrode based on receiving an electrical signal corresponding to a second color mode different from the first color mode.

11. The home appliance of claim 10, wherein
the processor is configured to:
control the power supply to apply the voltage between the first electrode and the second electrode for a predetermined time based on the electrical signal corresponding to the first color mode or the second color mode being received, and
control the power supply to stop applying the voltage after the predetermined time has elapsed.

12. The home appliance of claim 11, wherein
the processor is configured to, after a reference time has elapsed after controlling the power supply to stop applying the voltage, control the power supply to apply the voltage between the first electrode and the second electrode for the predetermined time.

13. The home appliance of claim 1, wherein
the color cell includes a plurality of color cells, the electrophoretic layer includes a light transmitting portion applied to the first electrode and configured so that light is passable through the light transmitting portion, and the plurality of color cells is disposed within the light transmitting portion.

14. The home appliance of claim 13, wherein
the light transmitting portion includes a plastic material cured by heat.

15. The home appliance of claim 1, wherein
the second electrode includes a light-blocking material.

16. A home appliance, comprising:
a body;
an electrophoretic display (EPD) panel disposed on a surface of the body, the EDP panel including:
  a plate configured to cover at least a portion of the surface of the body,
  a first electrode between the plate and the body,
  a second electrode between the first electrode and the body so as to face the first electrode,
  an electrophoretic layer between the first electrode and the second electrode, and including a color cell including:
    first charged particles inside the color cell and having a first color, and
    second charged particles inside the color cell and having a second color different from the first color, and
  a protective plate attached to a rear surface of the second electrode and including a material different from a material of the plate, and
  a coupling portion coupling the protective plate to the surface of the body, the coupling portion extending between the protective plate and the surface of the body so as to contact a portion of the protective plate that is less than an entirety of the protective plate,
wherein the material included in the protective plate has a higher rigidity than the second electrode and the electrophoretic layer so as to distribute a load transmitted from the coupling portion to the electrophoretic layer,
wherein the plate, the first electrode, the electrophoretic layer, the second electrode, and the protective plate are stacked in a stacking direction, and the coupling portion is coupled to a rear surface of the protective plate in the stacking direction, and
the EPD panel is configured so that:
  light is passable through the plate and the first electrode,
  the first charged particles and the second charged particles are flowable within the color cell,
  the second charged particles have a different charge than the first charged particles, and
  a color presented by the EPD panel is changeable based on a voltage between the first electrode and the second electrode.

* * * * *